United States Patent
Kaufman et al.

(10) Patent No.: US 12,182,723 B2
(45) Date of Patent: Dec. 31, 2024

(54) ITERATIVE ONLINE LEARNING TO IMPROVE TARGETED ADVERTISING

(71) Applicant: Dstillery, Inc., New York, NY (US)

(72) Inventors: Jason Jerard Kaufman, White Plains, NY (US); Amelia Grieve White, Old Greenwich, CT (US); Christopher Allen Jenness, Brooklyn, NY (US); Mark Alan Jung, Lewisville, TX (US); Melinda Han Williams, Brooklyn, NY (US)

(73) Assignee: Dstillery, Inc., New York, NY (US)

( * ) Notice: Subject to any disclaimer, the term of this patent is extended or adjusted under 35 U.S.C. 154(b) by 0 days.

(21) Appl. No.: 18/310,018

(22) Filed: May 1, 2023

(65) Prior Publication Data
US 2024/0370733 A1    Nov. 7, 2024

(51) Int. Cl.
G06N 3/09       (2023.01)
G06Q 30/0242    (2023.01)
G06Q 30/0273    (2023.01)

(52) U.S. Cl.
CPC .......... *G06N 3/09* (2023.01); *G06Q 30/0246* (2013.01); *G06Q 30/0275* (2013.01)

(58) Field of Classification Search
CPC ... G06N 3/09; G06Q 30/0246; G06Q 30/0275
See application file for complete search history.

(56) References Cited

U.S. PATENT DOCUMENTS

| | | | | |
|---|---|---|---|---|
| 2008/0275757 | A1* | 11/2008 | Sharma | G06Q 30/02 |
| | | | | 705/7.29 |
| 2019/0005575 | A1* | 1/2019 | Zeldin | G06Q 30/08 |
| 2019/0065594 | A1* | 2/2019 | Lytkin | G06F 16/951 |
| 2019/0294642 | A1* | 9/2019 | Matlick | G06F 16/958 |

(Continued)

OTHER PUBLICATIONS

Linear form (2023) Wikipedia. Available at: https://en.wikipedia.org/wiki/Linear_form (Accessed: Apr. 17, 2023). (Year: 2023).*

(Continued)

*Primary Examiner* — Miranda M Huang
*Assistant Examiner* — Sidney Vincent Bostwick
(74) *Attorney, Agent, or Firm* — COOLEY LLP

(57) ABSTRACT

A method includes accessing web browsing history for a plurality of users, generating embedding vectors based on the web browsing history for websites, and selecting a model configured to receive embedding vectors and output probability of a conversion events. Further, the method includes calculating a probability of a conversion event for the various websites using the model, selecting a subset of websites from the various websites based on websites having associated probabilities greater that a predetermined probability threshold, and receiving an indication that an impression has been displayed to a user when the user visits a website from the subset of websites, obtaining a plurality of conversion rates, each conversion rate is determined for each website from the subset of websites based on a number of conversion events associated with the plurality of visitation events, and updating the model parameters of the model using the obtained plurality of conversion rates.

11 Claims, 10 Drawing Sheets

(56) References Cited

U.S. PATENT DOCUMENTS

2021/0004437 A1\* 1/2021 Zhang .................... G06N 20/20
2022/0121884 A1\* 4/2022 Zadeh ................. G06V 10/764

OTHER PUBLICATIONS

Qiu, Yang, et al. "Predicting conversions in display advertising based on URL embeddings." arXiv preprint arXiv:2008.12003 (2020). (Year: 2020).\*

Montgomery, Alan L., et al. "Predicting online purchase conversion using web path analysis." Marketing Science 23.4 (2004): 579-595. (Year: 2004).\*

\* cited by examiner

ITERATIVE ONLINE LEARNING TO IMPROVE TARGETED ADVERTISING

TECHNICAL FIELD

The present disclosure generally relates to systems and methods for predicting a user action while browsing websites based on actions of other users when visiting websites.

BACKGROUND

Some embodiments described herein relate to unsupervised or semi-supervised machine learning techniques that enable improvements in predicting user actions while encountering advertisements when browsing internet websites. An advertisement is converted when a user who views the advertisement takes some action desired by the advertiser, such as, for example, purchasing a product, service, or subscription featured in the advertisement, or engaging in additional research of the product of service, such as visiting the advertiser's website or any other action indicative of user engagement with the advertisement (e.g., clicking on a link associated with the advertisement). Such actions by a user are described as conversion events or conversions. Further, an action of displaying an advertisement to a user herein is defined as an impression.

In most cases, the purpose of an advertising campaign is to increase sales by driving consumers to the product. Hence, whether an advertisement (herein also referred to as an ad) is converted is typically a key measure of success of the advertising campaign. Historically, evaluating the success of an advertising campaign has been difficult. With the development of Internet advertising and techniques such as the tracking cookie, merchants were finally able to collect reliable metrics on an ad-by-ad basis. This influx of data allowed merchants to count each time a user interacted with their ads, and even each time a consumer made a purchase after viewing an ad.

To optimize placement of ads on various websites it is important to determine a probability of conversion events for an ad for a particular product or service when it is placed on a given website. Current methods require showing ads on a website (at a cost) in order to observe the conversion probability for that website, making it impractical to both discover a large set of useful inventory and delivery an effective advertising campaign at the same time. Current approaches, based on Thompson sampling, for example, do not allow for efficient determination of probabilities of conversion events, as it takes time (e.g., a day or a few days) to receive conversion event data from users that are exposed to the impressions when visiting various websites. Also, conversion events generally occur only for a small fraction of website visitations and for a relatively small subset of websites. Thus, there exist a need for systems and methods (e.g., computer models) for improving data processing associated with users interacting with different websites and determining, based at least on a probability of conversion events for an advertisement displayed at various websites, the optimized placement of ads on different websites. The disclosed system and methods significantly optimize the placement of ads on various websites.

SUMMARY

Consistent with one disclosed embodiment, a computer-implemented method is provided. The computer-implemented method includes accessing web browsing history associated with a plurality of users, for each website from a plurality of websites, generating an embedding vector based on the web browsing history, and selecting a model determined by model parameters, the model configured to receive as an input an embedding vector for a website from the plurality of websites and output a probability score of a conversion event in response to the user visiting the website. Further, the computer-implemented method includes for each embedding vector representing a website from the plurality of websites, using the model, calculating a probability score of a conversion event for the website, and selecting a subset of websites from the plurality of websites based on a probability score of a conversion event for each website from the subset of websites being greater that a predetermined score threshold. Further, the computer-implemented method includes for each visitation event from a plurality of visitation events of a website from the subset of websites, receiving an indication that an impression has been displayed to a user, obtaining a plurality of conversion rates, each conversion rate from plurality conversation rates being determined for each website from the subset of websites based on a number of conversion events associated with the plurality of visitation events, and updating the model parameters of the model using the plurality of conversion rates.

Consistent with another disclosed embodiment, a non-transitory computer-readable medium storing instructions is provided. The processor is configured to execute the instructions to perform operations of accessing web browsing history associated with a plurality of users, for each website from a plurality of websites generating an embedding vector based on the web browsing history, and selecting a probability distribution function representing probability of selecting of model parameters associated with a computer model that is configured to receive an embedding vector representing a website as an input and output a probability of a conversion event when a user visits the website, the probability distribution function being a normal distribution function in a space of model parameters characterized by a selected mean parameter and a selected covariance parameter. Further, the operations include based on the probability distribution function, sampling at least one set of model parameters, and selecting at least one model determined by the at least one set of model parameters, each set of model parameters from the at least one set of model parameters corresponding to each model from the at least one model, the at least one model configured to take a website embedding vector and output a probability of a conversion event in response to the user visiting the website. Further, the operations include for each selected model calculating a probability of a conversion event for each website from a plurality of websites using the at least one model, for each selected model, selecting a subset of websites from the plurality of websites having associated probabilities greater that a predetermined probability threshold, and for each visitation event from a plurality of visitation events of a website from the subset of websites, receiving an indication than an impression has been displayed to a user. Further, the operations include obtaining a plurality of conversion rates, each conversion rate from the plurality of conversion rates being determined for each website from the subset of websites based on a number of conversion events associated with the plurality of visitation events and updating the probability distribution function based on the obtained plurality of conversion rates.

Consistent with another disclosed embodiment a computer-implemented method is provided. The computer-implemented method includes accessing web browsing history associated with a plurality of users, for each website from a plurality of websites, generating an embedding vector based on the web browsing history, and selecting a first probability distribution function of model parameters that determines a probability of sampling first model parameters associated with a first computer model that results in the first computer model returning a prediction of a probability of a conversion event, the first probability distribution function being a first normal distribution characterized by a first selected mean parameter and a first selected covariance parameter. Further, the computer-implemented method includes selecting a second probability distribution function of model parameters that determines a probability of sampling second model parameters associated with a second computer model that results in the second computer model returning a prediction of a probability of a conversion event, the second probability distribution function being a second normal distribution characterized by a second selected mean parameter and a second selected covariance parameter, based on the first probability distribution function, sampling at least one set of first model parameters, and based on the second probability distribution function, sampling at least one set of second model parameters. Further, the computer-implemented method includes selecting a first computer model determined by the at least one set of first computer model parameters and a second computer model determined by the at least one set of second model parameters, the first computer model and the second computer model each configured to take a website embedding vector and output a probability of a conversion event in response to the user visiting the website, calculating, using the first computer model, a first plurality of conversion probabilities for each website from a plurality of websites, and calculating using the second computer model, a second plurality of conversion probabilities for each website from a plurality of websites. Further, the computer-implemented method includes selecting a subset of websites from the plurality of websites for which a conversion probability from at least one of the first plurality of conversion probabilities or the second plurality of conversion probabilities being greater than a predetermined probability threshold for each website from the subset of websites, obtaining an indication of a plurality of conversion rates, each conversion rate from the plurality of conversion rates associated with a website from the subset of websites, updating the first probability distribution function based on the obtained plurality of conversion rates, and updating the second probability distribution function based on the obtained plurality of conversion rates.

In various embodiments, bid factoring may be another approach to placing digital ads, where the decision is driven by not which inventory is available/allowed for ad placement (or not only by which inventory is available/allowed), but by how much each impression will cost. A "bid factor" is a number greater than zero, used as a multiplier on a base bid price, to either increase or decrease the price of the inventory. In this way, an advertiser may include in their inventory selection a website with a low probability of conversion but having a correspondingly low price for the impression. Thus, consistent with another disclosed embodiment, a computer-implemented method includes (a) accessing web browsing history associated with a plurality of users, (b) for each website from a plurality of websites generating an embedding vector based on the web browsing history, and (c) selecting a probability distribution function representing probability of model parameters, where the model is configured to receive an embedding vector representing a website as an input and output a probability of a conversion event when a user visits the website, the probability distribution function being a normal distribution function in a space of model parameters characterized by a selected mean parameter and a selected covariance parameter. Further, the computer-implemented method includes, (d) based on the probability distribution function, sampling at least one set of model parameters, (e) selecting at least one model determined by the at least one set of model parameters, each set of model parameters from the at least one set of model parameters corresponding to each model from the at least one model, the at least one model configured to take a website embedding vector and output a probability of a conversion event in response to the user visiting the website, and (f) for each selected model calculating a probability of a conversion event for each website from a plurality of websites using the at least one model. Further the computer-implemented method includes (g) for each selected model and each website from the plurality of websites, selecting a bid factor for determining a cost of displaying an impression at each website based on the probability of conversion, and (h) for each selected model, selecting a set of websites from the plurality of websites (which may include all of the websites from the plurality of websites) having associated probabilities greater that a predetermined probability threshold. Further the computer-method includes (i) for each visitation event from a plurality of visitation events of a website from the subset of websites, receiving an indication that an impression has been displayed to a user, (j) obtaining a plurality of conversion rates, each conversion rate from the plurality of conversion rates being determined for each website from the subset of websites based on a number of conversion events associated with the plurality of visitation events and (k) updating the probability distribution function based on the obtained plurality of conversion rates.

The foregoing general description and the following detailed description are exemplary and explanatory only and are not restrictive of the claims.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Aspects of the present disclosure are related to system and methods for determining a probability of a conversion event of an impression at a given website. It should be noted that ads may be displayed not only on websites per se, but on any other suitable advertisement inventory or ad placements within a digital advertising platform including mobile in-app advertising, connected TV, digital out-of-home, or any other platform or medium. The term "website" used throughout this disclosure for ease of discussion, should be understood as including any suitable electronic platform or medium through which dynamic content (including advertisements) can be viewed, accessed, or consumed. Further, in various cases, the advertisement inventory, such as a website can include or be associated with inventory-specific attributes (e.g., a time of day at which a user accesses the inventory, a location of a user accessing the inventory, graphical dimensions of a space associated with the inventory, or any other suitable inventory-specific attributes) which further may influence a determination of the probability of conversion events for an ad for a particular product or service when it is displayed by the advertisement inventory. The determination of the probability of a conversion event for the advertisement inventory (e.g., a website) may be used for selecting a website to place an advertisement. In some cases, the website may be chosen from a large set of websites based on the determined probability value. Additionally, or alternatively, a determination whether or not to select a particular website for displaying the advertisement may be concluded based on the determined probability value. In some cases, a price for paid for a given advertisement inventory for displaying the advertisement may be selected based on the determined probability value, for example, when ad inventory is purchased in an auction and the advertiser chooses the bid price, which is herein is also referred to as a bid.

Figure 1:
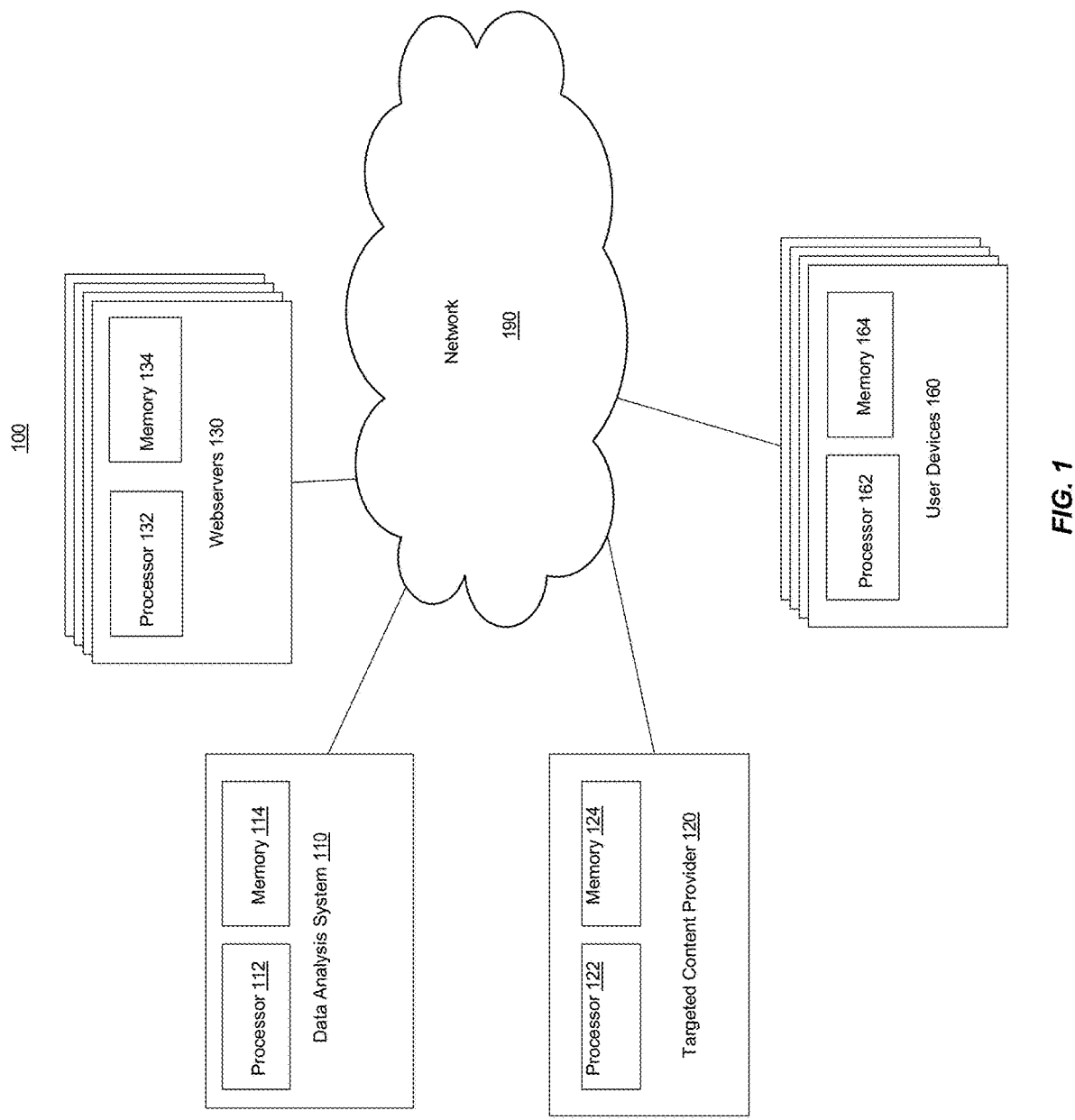
FIG. 1 is a schematic illustration of a system for determining a probability of conversion events for websites, according to an embodiment.

FIG. 1 is a schematic illustration of a system 100, according to an embodiment. The system 100 includes a data analysis system 110, a targeted content provider 120, one or more webservers 130, and one or more user devices 160, each communicatively coupled via a network 190. References to "a" data analysis system, targeted content provider, webserver, or user device should be understood include one or more of such systems, providers, servers, and/or devices. The network 190 can be the internet, an intranet, a local area network (LAN), a wide area network (WAN), a virtual network, a telecommunications network, any other suitable communication system and/or combination of such networks. The network 190 can be implemented as a wired and/or wireless network.

The user devices 160 are computing entities, such as personal computers, laptops, tablets, smartphones, or the like, each having a processor 162 and a memory 164. The processor 162 can be, for example, a general-purpose processor, a Field Programmable Gate Array (FPGA), an Application Specific Integrated Circuit (ASIC), a Digital Signal Processor (DSP), and/or the like. The processor 162 can be configured to retrieve data from and/or write data to memory, e.g., the memory 164, which can be, for example, random access memory (RAM), memory buffers, hard drives, databases, erasable programmable read only memory (EPROMs), electrically erasable programmable read only memory (EEPROMs), read only memory (ROM), flash memory, hard disks, floppy disks, cloud storage, and/or so forth. Each user device 160 can be operable to access one or more of the webservers 130. For example, a user operating a user device 160 to browse the internet (e.g., the network 190) can access webpages stored on one or more of the webservers 130.

The targeted content provider 120 can be a computing entity operable to select, deliver, and/or facilitate the delivery of one or more items of targeted content. For example, the targeted content provider 120 can be associated with an advertiser or advertising network that provides targeted content (e.g., an advertisement) that is displayed by a user device 160 when that user device 160 accesses a particular webserver 130. Similarly stated, targeted content selected, delivered, or facilitated by the targeted content provider 120 can include advertisements embedded within, displayed with, or otherwise associated with webpages displayed by a user device 160. The advertisements may include banners, internet video advertisements, social media advertisements, web teaser advertisements, online mobile advertisements (e.g., when user accesses an internet content via mobile device), internet location-based advertisements, advertisements within video content, and the like. The targeted content provider 120 includes a processor 122 and a memory 124, which can be structurally and/or functionally similar to the processor 162 and/or memory 164, respectively, discussed above.

The webservers 130 can be computing entities each having a processor 132 and a memory 134, which can be structurally and/or functionally similar to the processors 162 and/or memory 164, respectively, discussed above or the processors 122 and/or memory 124 respectively. In various embodiments, the webservers 130 are configured to provide content (e.g., websites) to user devices 160. In some cases, the webserver 130 may be configured to server multiple webpages to a user. For example, the webserver 130 may be associated with a website that includes multiple linked webpages. In various embodiments, when the webserver 130 serves a webpage to a user device, it may be configured to receive information (e.g., a targeted content such as an advertisement) from the target content provider 120 and display the received content at a location within the webpage. In an example implementation, the webserver 130 may be configured to send webpage-related information to the target content provider 120 about a webpage that is being served to a user device (e.g., the webserver may send to the target content provider 120 a webpage URL, webpage metadata, webpage keywords, links to other webpages, webpage source code, webpage-associated text, webpage-associated graphics, webpage-associated graphical user elements, or/and webpage-associated video links, and the like), and the targeted content provided 120 may be configured to receive information from the webserver 130, and based on the received information provide a particular advertisement to be displayed at that webpage.

The data analysis system 110 can be a computing entity configured to receive signals indicative of actions or behaviors of users associated with some or all of user devices 160 when browsing webpages. In one embodiment, the data analysis system 110 can receive web visitation data (herein, also referred to as a web browsing history) for user devices 160 and/or webservers 130 using any suitable technique for network traffic attribution (e.g., any suitable technique for identifying that a user device was used to access a webserver including, for example monitoring Internet Protocol (IP) addresses of user devices 160, user agents of user devices 160 and/or browser fingerprints, time of day, location, etc.). In some cases, cookie-based technique may be used to determine the web visitation data.

In some embodiments, when a webpage is accessed by the user device 160, the data analysis system 110 is configured to receive information that the webpage is being accessed. In some cases, the information is provided by the webserver 130 serving the webpage, and/or in some instances, the information may be provided by the user device 160. The information may include webpage-related information (e.g., the webserver may send to the data analysis system 110 a webpage URL, webpage metadata, webpage keywords, links to other webpages, webpage source code, webpage-associated text, webpage-associated graphics, webpage-associated graphical user elements, or/and webpage-associated video links, and the like).

Further, when a webpage is accessed by the user device 160, the data analysis system 110 is configured to receive advertisement-related information (or multiple advertisements) to be displayed with the webpage (e.g., the advertisement-related information may include an I-frame or other element configured to (automatically) embed the advertisement in the webpage, advertisement source code, advertisement-associated text, advertisement-associated graphics, advertisement-associated graphical user elements, advertisement associated video, a link to the webpage containing the advertisement, the advertisement URL, advertisement metadata, advertisement keywords, links to other advertisements found within the webpage associated with the advertisement, and/or the like).

In some cases, when a webpage is accessed by the user device 160, the data analysis system 110 is configured to receive user-related information (e.g., user-associated website visitation history, and/or user age, gender, occupation, previous purchases, previous conversion events associated with previously viewed impressions, and the like, when such user-related information is available). In some cases, the user-related information may be provided by the user device 160, and in other cases, for example, when a user is logged into an account associated with the user, the user-related information may be provided by the webserver 130.

In various embodiments, the data analysis system 110 is configured to receive conversion event data associated with user actions based on impressions displayed on a webpage served by webserver 130. The conversion event data may be transmitted to the data analysis system 110 by the webserver 130 hosting a webpage, and/or a webserver associated with an advertisement provided by the targeted content provided 120 (e.g., the advertisement provided by the targeted content provider 120 may include a link that, when being clicked by a user, takes the user to a webpage served by the webserver associated with the advertisement. Further, in some cases, the conversion event data may be transmitted to the data analysis system 110 by the user device 160.

The conversion event data can include, for example, purchase information from purchase confirmation websites, purchase history associated with a user account, a credit reporting bureau, customer loyalty program, survey information, or any other suitable source. The conversion event data can also include information regarding whether a user took any suitable brand action, such as clicking on a predefined advertisement or like, visiting a predefined website, physically visiting a retail location, or any other suitable conversion action. The conversion event data can include information not relating to any particular brand, such as visiting one of a set of predefined websites indicating interest in a product category, activity, or other interest. In various cases, the conversion event data may include the webpage-related information for a webpage used for rendering an impression that led to the conversion event as well as the advertisement-related information associated with the impression. Further, in some cases, the conversion event data may include user-related information, when such information is available.

In various embodiments, as indicated in FIG. 1, the data analysis system 110 includes a processor 112 and a memory 114, which can be structurally and/or functionally similar to the processor 122 and/or the memory 124, respectively, discussed above.

As discussed in further detail herein, the data analysis system 110 can be operable to apply computer-based models (e.g., interpolation models, least square fit models, linear models, non-linear models, machine learning models, such as supervised or unsupervised machine learning, and the like) to identify a probability of conversion event data based on the historical conversion event data associated with a webpage (or a website having multiple webpages). In addition, or alternatively, the data analysis system 110 can be operable to prepare and/or transmit analytics and/or other suitable reports that can aid a marketer or other suitable entity to understand a conversion event data including a probability of a conversion event for a given webpage (or a website). It should be understood that absolute or relative conversion probabilities can be determined. Additionally, absolute conversion probabilities can be converted to relative conversion probabilities and vice versa.

In some embodiments, the memory 114 can store a vector (herein, also referred to as an embedding vector) for each webpage (or website having multiple webpages). Such an embedding vector can represent association of a website with other websites in a format discussed in further detail in U.S. patent application Ser. No. 16/586,502, filed Sep. 27, 2019, the disclosure of which is hereby incorporated by reference in its entirety. The processor 112 can be operable to perform computer-based calculations on a matrix comprising embedding vectors of websites.

Figure 2:
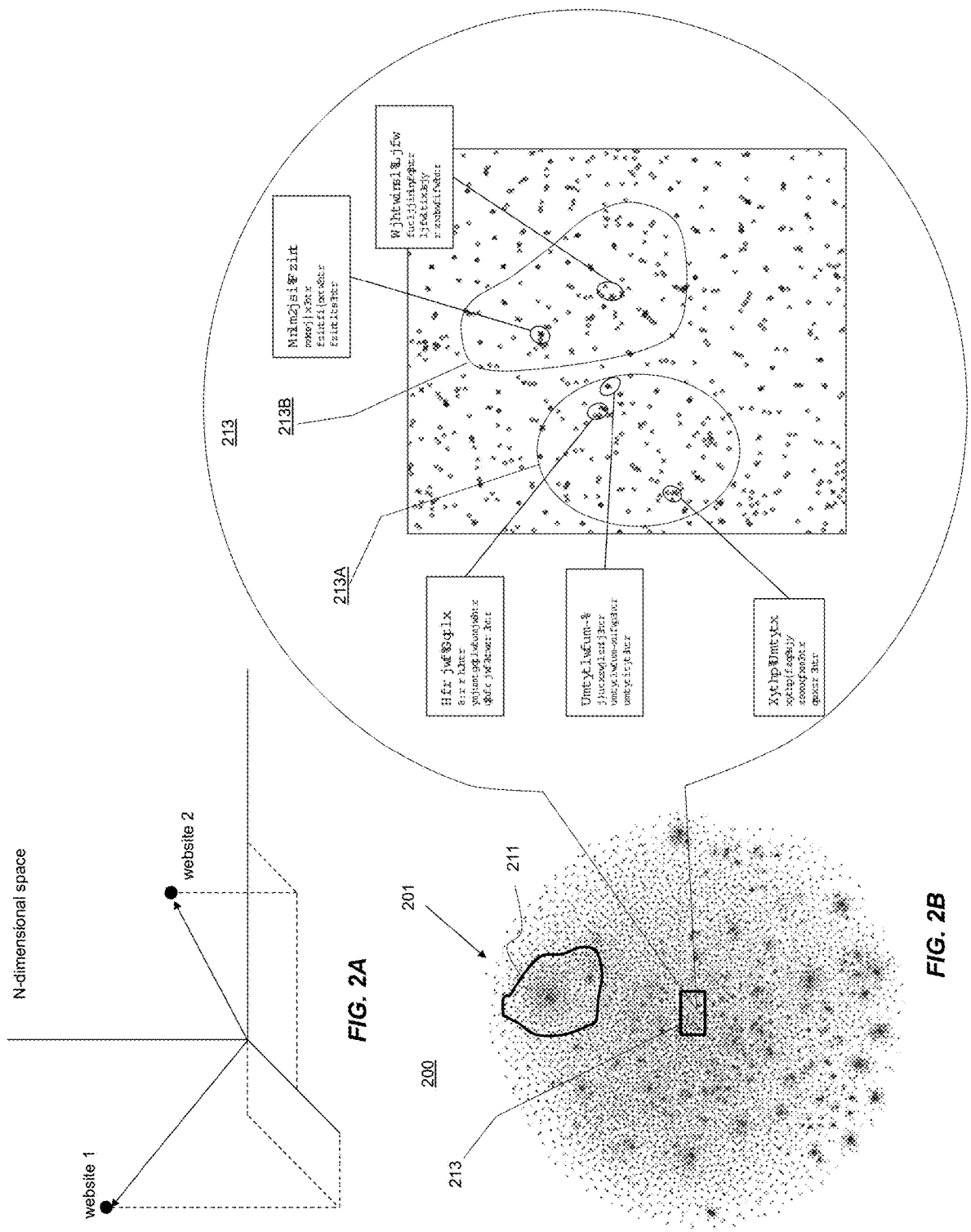
FIGS. 2A-2B are visualizations of embedding vectors corresponding to websites located in an n-dimensional embedding space, according to an embodiment.

FIGS. 2A and 2B visualize embedding vectors of websites as vectors in a n-dimensional embedding space, according to various embodiments. The representation of websites as embedding vectors can be used to identify similarities between the websites. For example, a website embedding vector is a mapping from a website to a point in an n-dimensional embedding vector space where websites are mapped based on observed visitation patterns. In this way, websites observed to have similar visitation patterns (e.g., two websites both frequently visited before visiting the same third website) may be mapped to nearby points. An embedding vector may be is a relatively low-dimensional vector (e.g., may have a dimensionality of few hundred elements, about a hundred elements, and the like). For example, number of dimensions n in the n-dimensional embedding vector space can be any suitable integer greater than 1, such as 3, 4, 10, 50, 100, 200, or 500. In some instances, it may be preferable for to be a value of $2^p$ (e.g., 32, 64, 128, 256, etc.)

In some cases, association between the websites may be established by analyzing links between websites or analyzing keywords within websites. Additionally, or alternatively, in some embodiments, association between the websites may be determined based on actual patterns of user interaction with websites. For example, meaningful relationships (e.g., distances in an n-dimensional vector space between points representing websites) between websites can be established via the website embedding vectors.

In various embodiments, website visitation data can be received from a number of users whose internet activity has been monitored. For example, a cookie-based tracking, a browser extension, or any other software application may be used for monitoring the web visitation data. In some cases, when an advertisement is displayed on a non-web-based advertisement inventory, a software or any other approach associated with that advertisement inventory may be used for tracking the visitation for that advertisement inventory. In some instances, website visitation from over 100,000, over 1,000,000, over 100,000,000, or over 200,000,000 users may be received. As discussed above, however, in other instances, cookie-based tracking may be unavailable for significant portions of users due to recent increases in private-browsing initiatives. Accordingly, in some instances the website visitation data may be received from a relatively small (hundreds to tens of thousands) number of users who have agreed to be tracked. The users may be selected to represent a subset of the general internet browsing public. Weights and other suitable data processing techniques can be applied to behavioral data to compensate for demographic and/or behavioral deviations between the monitored users and the general internet browsing public.

In some instances, the website visitation data for each user may include a list of all websites visited by that user and the order in which the websites were visited. In other instances, pairs of sequential website visitation events for a user can be stored for limited periods of time, optionally without any user identifiers, which can avoid the need to store full histories associated with specific users.

The website visitation data then may be processed by the data analysis system 110. For example, the data analysis system 110 may include a computer model (e.g., a rule-based computer model, a machine learning technique such as neural network, and the like), which can be applied to the website visitation data to define associations between websites based on which sites are frequently viewed in sequence. For example if multiple users are observed visiting www.netflix.com and www.hbo.com within a predetermined period of time and/or within a predetermined sequence (e.g., within 20 minutes, within an hour, without visiting any intervening websites, with fewer than five intervening websites, etc.), and similarly, multiple users (not necessarily the same users) are observed visiting www.tvtropes.com and www.hbo.com, then www.tvtropes.com and www.netflix.com can be mapped closer to each other in the n-dimensional embedding vector space. Moreover, two websites (target websites) viewed in the same context (where context is the sequence of websites visited before or after the target website) can be mapped closer to each other in the embedding vector space based on the frequency of websites viewed in the same context as observed over the set of all users.

Additionally, or alternatively other approaches may be used for determining association of websites (e.g., approaches that use keywords, or links between the websites). In some cases, the computer model of the data analysis system 110 may be used to combine various approaches described herein to determine association between the websites. For example, website visitation data may be used in combination with keywords and/or links between the websites to determine website associations. In some cases, website association using keywords may be determined based on search engine results. In some cases, the computer model may include natural language processing algorithms configured to analyze text within various websites to determine website association between the websites. For example, if the natural language processing algorithms determines that the first website is marketing sneakers and a second website discusses consumer reviews of various shoes, the natural language processing (NLP) algorithms may be configured to establish an association between the first and the second websites. As another example, using keywords or natural language processing (NLP) algorithms for extracting topic or any other suitable content from websites, a website about sneakers may be associated with a website about basketball.

FIG. 2A shows example embedding vectors for a website 1 and a website 2 in an n-dimensional embedding space 200, and FIG. 2B shows points 201 representing various websites in the n-dimensional embedding space 200.

In some cases, groups or clusters of websites can be identified, as shown in FIG. 2B. For example, website embedding vectors 211 located near each other in the n-dimensional space (according to any suitable distance metric) can be identified as belonging to a cluster, using k-means or another suitable clustering technique. FIG. 2B also shows a zoomed portion 213 of points representing the embedding vectors for various websites. The zoomed portion 213 may include mini-clusters associated with groups of websites. These mini-clusters may be arranged in various regions (e.g., regions 213A and 213B), with each region including websites (points shown in FIG. 2B) related to a particular topic. For example, region 213A includes websites related to graphics, while region 213B includes websites related to audio. In an example shown in FIG. 2B, region 213A includes a mini-cluster associated with Camera Blogs (e.g., websites 35mmc.com, thephoblographer.com, and 1-camera-forum.com), a mini-cluster associated with Photography (e.g., websites exposureguide.com, photographyspark.com, and photodoto.com), and a mini-cluster associated with Stock Photos (e.g., websites stockvault.net, unsplash.com, and lipsum.com). Further, region 213B includes a mini-cluster associates with High End Audio (e.g., websites hifinews.com, audioadvisor.com, and audiogon.com), and a mini-cluster associates with Recording Gear (e.g., websites apogeedigital.com, geargods.net, and musicradar.com).

In some cases, a cluster of website embedding vectors (e.g., cluster of embedding vectors 211) may define an audience (e.g., users who have visited a minimum number of websites corresponding to the cluster of embedding vectors 211). This audience may be used to associate other website embedding vectors to the cluster embedding vectors 211. For example, a user visits nike.com and reebok.com and these websites are located within the cluster embedding vectors 211, then when the same user visits newbalance.com, the computer model of the data analysis system 110 may determine that newbalance.com also belongs to the cluster embedding vectors 211.

In some cases, the distance between embedding vector for websites within n-dimensional space (e.g., how closely websites corresponding to these embedding vectors are associated with each other) is determined based on statistics of how close the websites corresponding to these embedding vectors are, on average, within a website visitation data sequence. For example, if newbalance.com is visited right after reebok.com is visited, such websites may be determined to be closely associated (e.g., the distance between embedding vectors for such websites in the n-dimensional space is small), whereas if after visiting reebok.com a user, on average, visits a large number of websites before visiting amazon.com, the amazon.com and reebok.com may be further apart (in terms of embedding vectors for these websites in the n-dimensional space) than reebok.com and newbalance.com. Further, in some cases, other factors (e.g., keywords, links, and the like) may be used for determining the proximity of embedding vectors for websites in the n-dimensional space.

In some cases, clusters of websites can be characterized (e.g., may be associated with a key website or a keyword). For example, a cluster of websites can be characterized by analyzing the website visitation data of users who visits websites within that cluster (e.g., users whose website visitation data indicates a minimum number of visits to websites in that cluster). Features of the website visitation data for users who visit a particular website cluster can be used to describe or classify that website cluster. For example, if website visitation data of visitors to websites within a cluster characteristically overindexes a particular website (a particular website appears more frequently than it does in website visitation data of a random sample of users), that overindexing website can be used to characterize the cluster. Typically, the overindexing website will be within the cluster, but in some instances, a cluster can be characterized by an overindexing website that is not within the cluster or an overindexing cluster other than that cluster. Such characterization of clusters can be descriptive, rather than prescriptive. Similarly stated, the cluster can be characterized after it is identified, rather than searching the embedding for websites associated with a keyword or the like.

The embedding vectors for websites can be used to select advertisement that can be displayed on the website. For example, for a given website a computer model may be used to first determine a probability of a conversion event (herein such a probability is referred to as a conversion probability) based on the embedding vector for that website, and then, second, select an advertisement for displaying at the website based on the conversion probability.

Various aspects of the present disclosure relate to a computer model M for determining a conversion probability for a website characterized by an embedding in an n-dimensional space. In various cases, the computer model M is configured to take as an input a website embedding vector characterized by an n-dimensional vector and output a scalar. In some instances, the output of the computer model M can be normalized to return, for example, a value between zero and one. It should be understood, however, that any suitable output format (e.g., scalar, vector, matrix, etc.) is possible.

The computer model M can be any suitable model that is capable to replicate the known data related to conversion probabilities. For example, the computer model M may be a neural network model trained on a known conversion probability data. In various cases, the computer model M may be based on a set of parameters (e.g., numerical coefficients) that may be determined (e.g., optimized) for the computer model M to predict accurately the conversion probabilities. For example, when the computer model M is described by a neural network, the parameters of the computer model may be weights of the neural network, number of layers of the neural network, parameters describing activation functions of the neural network, biases of the neural network, and the like. (Optimized as used herein does not necessarily refer to identifying an objective optimal solution, but instead to the minimization of a loss function or other suitable technique to arrive at least a local maximum or minimum representing, for example, conversion probability.)

In some cases, the computer model M may be represented by a linear model described by an n-dimensional vector $C=\{c_1, c_2, \ldots c_n\}$ that includes parameters (components) $c_1$, $c_2, \ldots c_n$. The computer model M may then take as an input the embedding vector $w_1$ for a website W1 (e.g., the embedding vector may be represented by $w_1=\{w_{11}, w_{12}, \ldots w_{1n}\}$) and provide a score $p_1$ related to the probability of a conversion event as $p_1=C \cdot w_1 = c_1 w_{11} + c_2 w_{12} + \ldots c_n w_{1n}$. Similarly, for a website W2 represented by the embedding vector $w_2=\{w_{21}, w_{22}, \ldots w_{2n}\}$ a score $p_2$ related to the probability of a conversion event is given by $p_2 = C \cdot w_2 = c_1 w_{21} + c_2 w_{22} + \ldots c_n w_{2n}$. The indications $p_1$ and $p_2$ can be used to obtain a relative probability of conversion event of one website relative to another website.

The scores $p_1$ and $p_2$ may be calculated as $p_1 = C \cdot w_1 = \|C\| \|w_1\| \cos(\theta_1)$ and $p_2 = C \cdot w_2 = \|C\| \|w_2\| \cos(\theta_2)$, where $\|C\|$ is a norm of vector $C$ and $\|w_1\|$ and $\|w_2\|$ are respective norms of vectors $w_1$ and $w_2$ (herein, $\|C\|=\sqrt{\Sigma_i c_i^2}$, $\|w_1\|=\sqrt{\Sigma_i w_{1i}^2}$, and $\|w_2\|=\sqrt{\Sigma_i w_{2i}^2}$ (here operator $\|$ denotes absolute value). Here angles $\theta_1$ and $\theta_2$ are shown in FIG. 3 as angles between vectors $w_1$ and $w_2$, and vector C of the computer model M.

In cases where an actual calibrated probability is needed, rather than simply a score that provides a rank-ordering of probabilities, an appropriate function must be used to output a probability, given a probability score, and the model must be calibrated to correspond to actual observed conversion relates. In the case of logistic regression, the logistic function $L(p_m)=1/(1+\exp(-p_m))$ may be used, where $p_m$ is a score, such as $p_1$ or $p_2$, as described above, where an appropriate constant additive factor has been added to the probability score to result in a calibrated probability.

Figure 3:
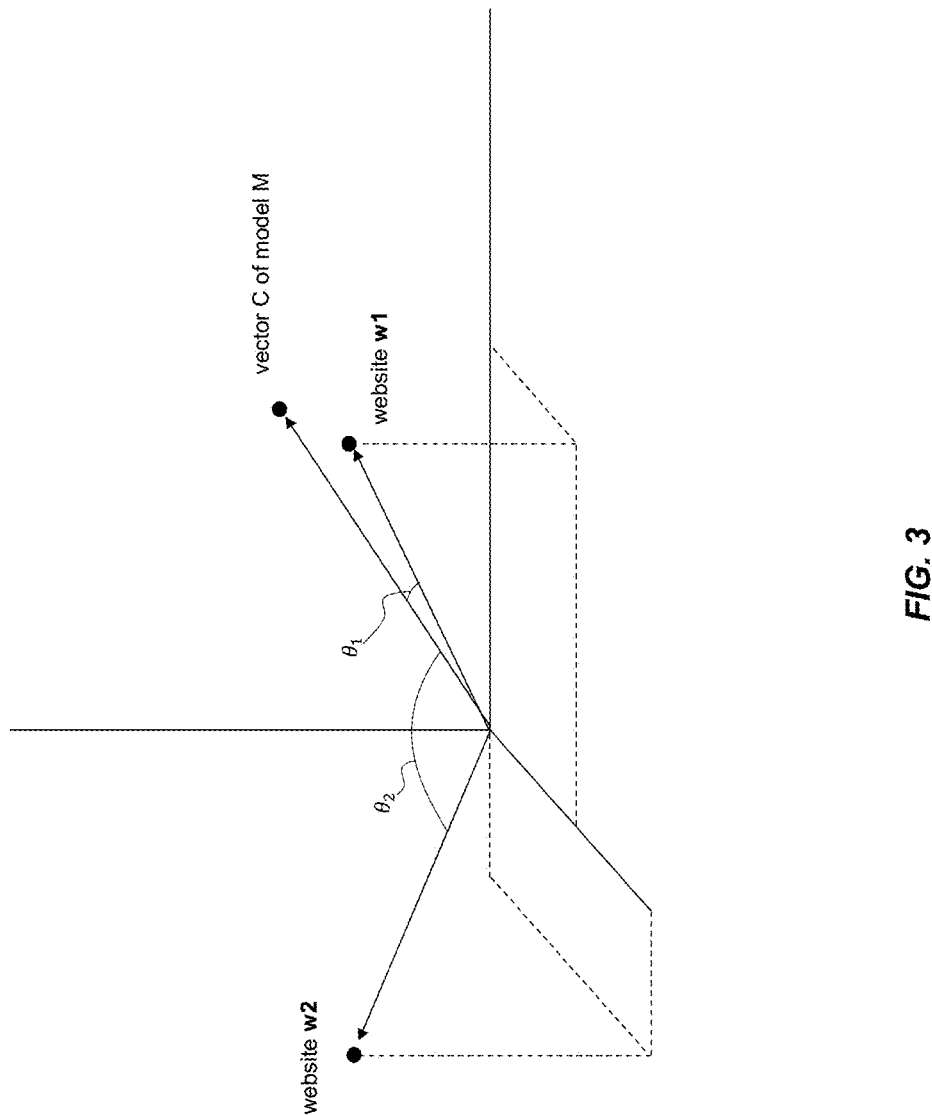
FIG. 3 is a visualization of embedding vectors corresponding to websites located in an n-dimensional embedding space, as well as an n-dimensional vector corresponding to a computer model for determining probabilities of conversion events, according to an embodiment.

In various embodiments, a computer model (e.g., the computer model M, as shown in FIG. 3) can be optimized (herein, also referred to as trained) based on the conversion event data for a plurality of websites. Herein, as discussed above, a website may include multiple webpages.

Figure 4:
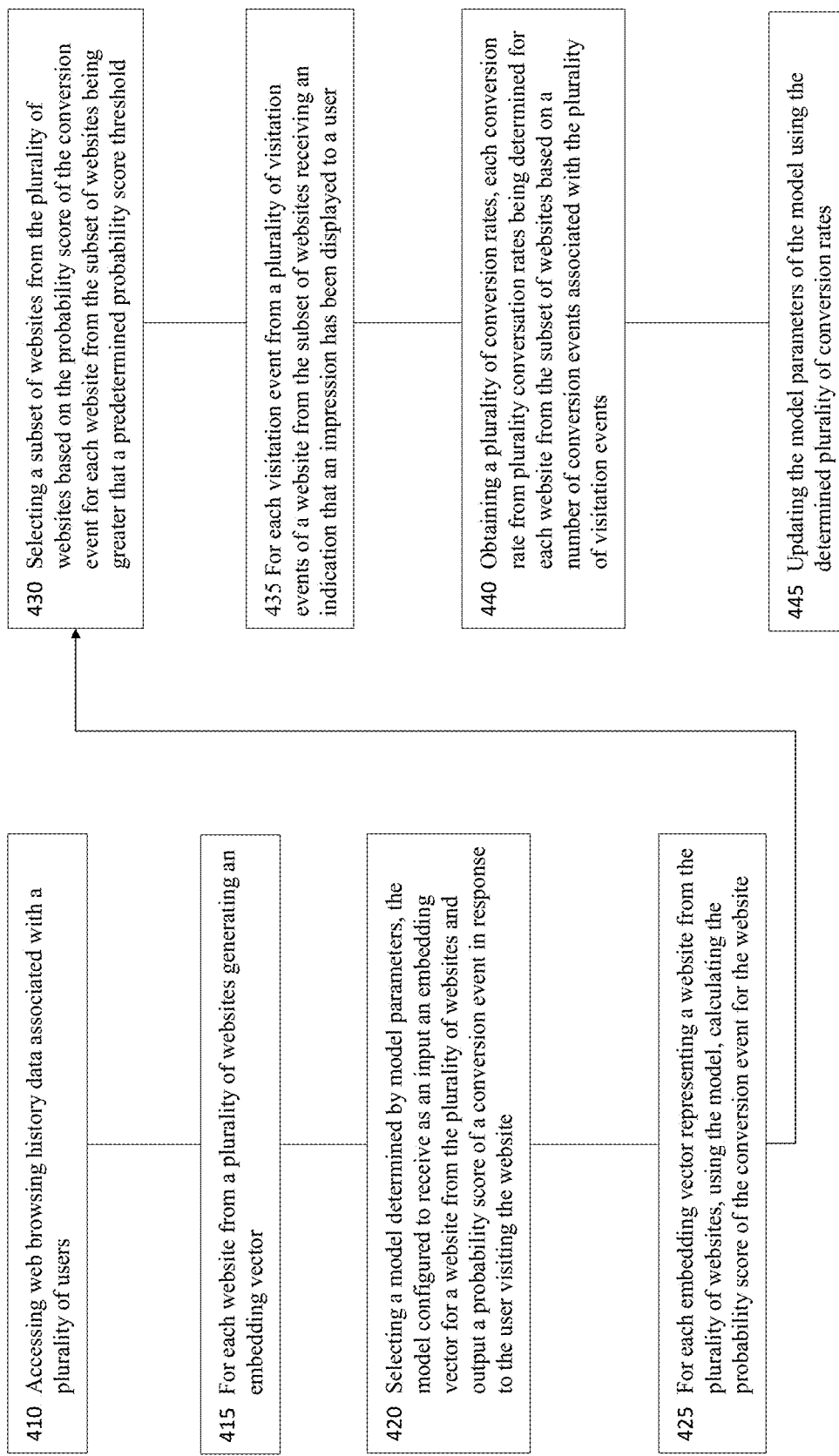
FIG. 4 is an illustrative diagram of a method for determining a probability of a conversion event for a website, according to an embodiment.

An example method 400 for optimizing performance of the computer model M is shown in FIG. 4. The method 400 includes accessing web browsing history associated with a plurality of users at 410. As described above, the cookie-based tracking or any other suitable technique may be used to collect the web browsing history. The web browsing history corresponds to various users accessing the plurality of the websites that are used for determining an embedding for different websites. Typically, the web browsing history for a user will include one or more websites from the plurality of websites visited by the user.

In some cases, users representing a general populations may be sampled. Alternatively, if a particular subset of users is targeted (e.g., a particular subset of users may be based on a user location, gender, age, belonging to a particular social group or social network, financial status, time of the year (or time of the day) when users access the Internet, and the like), that subset of users may be sampled to collect the web browsing history. In some cases, as described above, a subset of users may be defined by a website cluster that is accessed by these users, and such subset of users may be sampled to collect the web browsing history.

Figure 5:
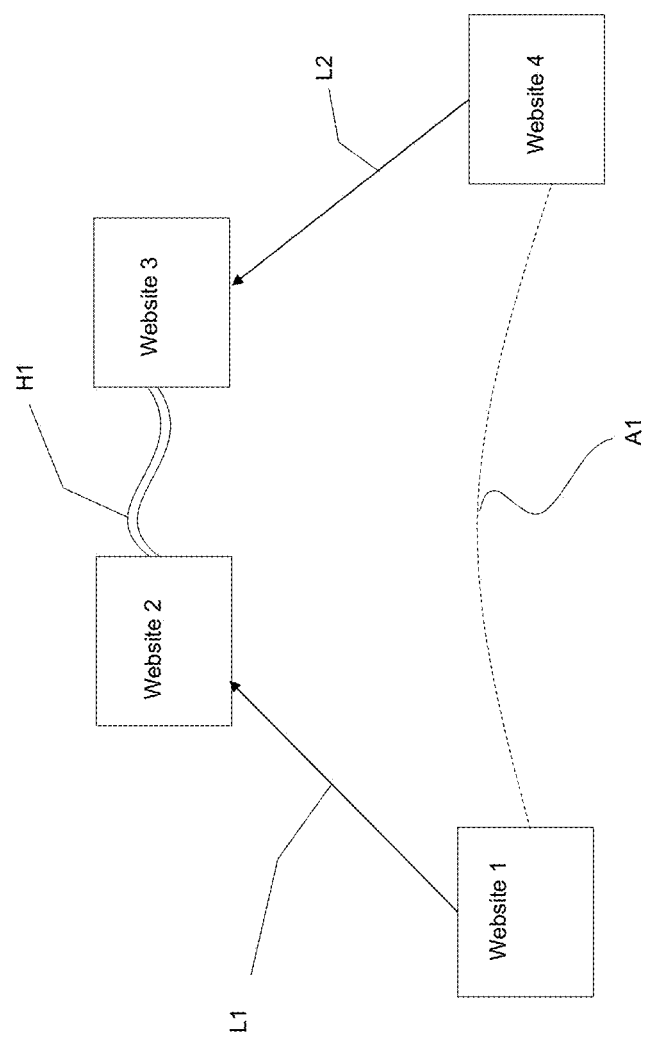
FIG. 5 is an illustrative diagram showing a possible association of websites, according to an embodiment.

Further, the method 400 includes generating an embedding vector for each website (or a webpage) from the plurality of websites at 415. As described above the embedding vector for the website may be an n-dimensional vector, as shown, for example in FIG. 3 by vectors $w_1$ or $w_2$. Further, as described above, the embedding vector may be generated based on the web browsing history for different users. Additionally, in some cases, the association between websites represented by embedding vectors may be determined using keywords found withing words associated with the websites, keywords found within description of these websites (e.g., the descriptions of the websites that can be used to facilitate searching for these websites using search engines), or any other words found within a source code associated with these websites. Further, the association between websites may be determined using links between the websites. For example, FIG. 5 shows a website 1 associated with a website 2 via a direct link L1 (e.g., a hyperlink included in website 1 that points to website 2), and a website 4 associated with a website 3 via a direct link L2. Further, the website 2 and the website 3 may be associated with each other via web browser history H1 (e.g., the website 2 may be accessed by a user, and that user, after accessing website 2, accesses website 3). Thus, website 1 can be associated with website 4 via links L1, L2, and the web browsing history H1. Such an association is indicated by a connector A1, as shown in FIG. 5.

It should be also noted that web browsing history, and/or keywords, and/or links may not be the only means for determining association between the websites. In some cases, any digital information can be used for associating websites (e.g., video data, image data, audio data, binary data, and combination thereof). For example, websites containing similar images can be determined to be associated with each other. In some cases, when associating different websites to determine embedding vectors for the websites various image processing, video processing, or any other suitable data processing algorithms may be used for determining association with websites. In one embodiment, the combination of keywords and images may be used for determining the association between the websites. In another embodiment, the combination of keywords and information obtained from the web browsing history may be used for determining association between websites, and, as a consequence, embedding vectors for different websites.

Returning to FIG. 4, the method 400 includes selecting a computer model (e.g., the computer model M, as shown in FIG. 3) determined by model parameters. The computer model is configured, at 420, to receive as an input an embedding vector for a website and output a probability score of a conversion event in response to user visiting the website. As discussed above, in relation to FIG. 3, the computer model M may be characterized by model parameters (e.g., parameters $c_1, c_2, \ldots c_n$) and is configured to take as an input an embedding vector for a website and output the conversion probability associated with a conversion event after a user is presented with an impression for a particular advertisement. In various cases, the computer model M may be configured to generate either a probability score of a conversion event when a user visits the website or a conversion probability for a particular advertisement. In most instances, a different computer model is used for each advertisement. A computer model may be specific to a brand or an advertiser, or specific to a particular conversion event for that brand. For example, a first computer model may be used for an advertisement associated with a first shoe brand (e.g., shoe brand X) and a second computer model, different from the first computer model may be used for an advertisement associated with a second shoe brand (e.g., shoe brand Y). In some cases, a first computer model may be used for the advertisement associated with the shoe brand X when the conversion event includes visiting the home page, while a second computer model may be used for the advertisement associated with the shoe brand X when the conversion event includes purchasing the shoe brand X. It should be noted that for various conversion events (e.g., conversion events associated with viewing a page for a specific product, reviewing information about the specific product, reviewing products similar to the specific product, and the like) computer models specific to that conversion event may be used. In some cases, the computer model can also be specific to a particular visualization associated with an advertisement (e.g., a graphical representation of the advertisement, or language used in the advertisement) for a particular product. Thus, for the same product and the same conversion event a different model may be used based on the graphical representation of the advertisement.

It should be noted that various other web browsing scenarios may be considered when determining a probability score of a conversion event or a probability of a conversion event. For example, the probability of a conversion event may be based not only on a visitation of a particular website, but also on a visitation of a particular sequence of websites (or a pattern associated with a sequence of websites). For instance, a sequence may include visiting website 1 that reviews a Nike shoe, and then visiting nike.com. Such sequence of web browsing data may result in a higher conversion probability for buying shoes, comparing to conversion probability associated with the user visiting bike-mounted drinking bottle supply website and then visiting nike.com.

In some cases, the probability of a conversion event may be influenced by a user exposed to a combination of multiple impressions. For example, seeing a first impression (e.g., information related to scarcity of vaccines) and a second impression (e.g., information about vaccine providers). Thus, multiple advertisements (in some cases, presented to a user in a particular sequence of advertisements) may affect the overall decision of the user to convert vs. a single advertisement or other sequences of advertisements. In various cases, the probability of a conversion event may be established based on historical data describing a correlation between visiting multiple websites and seeing multiple impressions by a user, and the performing a conversion event by the user.

As discussed above, the computer model M described by model parameters $c_1, c_2, \ldots c_n$, as outlined above in relation to FIG. 3, is only one possible way of determining conversion probabilities. Alternatively, the computer model M may be a neural network model, and the model parameters may be the weights associated with the neural network, and/or number of neural network layers and/or number of neural network nodes for each of neural network layer.

In various embodiments, a computer model for predicting a probability of conversion events (e.g., the computer model M) is configured to be optimized to result in sufficiently accurate predictions of probabilities of conversion events when comparing with the actual/observed conversion rates for different websites. Herein, the accuracy of the predictions can be evaluated by calculating a differences (or absolute values of the differences, or squares of the differences, or percentages of the differences, or percentages of squares of the differences, and the like) between the probability results predicted by the computer model M and the results obtained based on known conversion data for the plurality of websites. If the differences (or absolute values of the differences, or squares of the differences or percentages of the differences, or percentages of squares of the differences, and the like) are below a predetermined threshold value, then the accuracy of the computer model M is determined to be sufficient. In an example implementation, if the computer model M outputs a score p which results in probability l, and the probability based on known conversion data is P, then the error E in the accuracy may be established as $E=100\% \times |l-P|/P$. The accuracy may be established if the error E is less than a selected accuracy threshold. It should be understood that the conversion rates predicted by the model M and/or the observed conversion rates can be normalized, calibrated, and/or corrected before they are compared.

In various embodiments, the optimization of the computer model M for determining probability of conversion events may include iteratively adjusting model parameters of the computer model M until the computer model M produces sufficiently accurate results. Such optimization process is described by events 425-445 of method 400, as shown in FIG. 4. At 425, for each embedding vector representing a website from a plurality of websites, using the computer model M, the method 400 includes calculating a probability score of a conversion event for the website.

The method 400 includes selecting a subset of websites from the plurality of websites based on a probability score of a conversion event for each website from the subset of websites being greater than a predetermined probability score threshold at 430. The predetermined probability score threshold may be any suitable threshold. In some cases, between about 1-20 percent of all websites having the associated subset of highest scores may be used, including all the values and ranges in between. In some cases, a predetermined number of websites in the subset of websites may be selected (e.g., about 10-10,000 websites including various numbers of websites in between). For example, the number of the plurality of websites may be determined by the amount of computational resources available for training the computer model M. In some cases, the number of websites selected may be based on the number of impressions that an advertiser plans to display at various websites during a period for training the computer model M. In various cases, the training the computer model M may be performed simultaneously while the advertiser runs an advertising campaign. Thus, the number of websites selected for training the computer model M may be adjusted during the advertising campaign depending on an estimate of the number of impressions that are displayed or are planned to be displayed during the advertising campaign and/or the budget available to the advertiser. The number of impressions shown on each website by the advertiser may be estimated based on available inventory at each website (e.g., spaces where the advertisement may be displayed), and how readily this inventory may be obtained by the advertiser (e.g., how expensive is the inventory and how likely the advertiser can obtain the inventory by bidding for that inventory).

At 435, the method includes for each visitation event from a plurality of visitation events of a website from the subset of websites receiving an indication that an impression has been (or is being) displayed to a user. The indication may be received by the data analysis system 110 and it may be transmitted to the data analysis system 110 from the web-server 130, target content provider 120, and/or user device 160. Indications of actual conversion events produced by these impressions can also be received, at 435. For example, an indication of 1000 impressions and 10 click-throughs (or other conversions) can be received.

At 440, the method 400 includes obtaining a plurality of conversion rates, each conversion rate from plurality conversation rates being determined for each website from the subset of websites based on a number of conversion events associated with the plurality of visitation events for websites selected at 435. For example, if the website nike.com is one of the websites in the subset of websites, and if impressions are shown at that website 1000 times and actual conversion events occurred 10 times, then the actual conversion is determined to be $P=10/1000=0.01$. Similar actual conversion rates can be determined for all of the websites in the subset of websites. In some instances, the indication of impression and/or conversion rate information may be or include aggregated data describing, for example, for how many visitation events and conversion events occurred (i.e., the indications of visitation events and/or conversion events may not include information about individual users, impressions, or conversion actions).

Figure 6A:
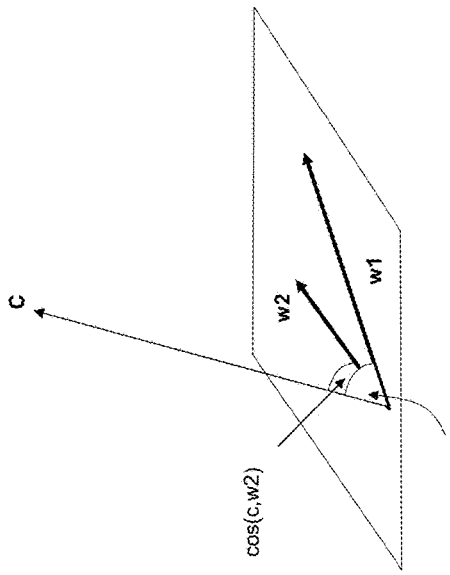
FIG. 6A is an illustrative diagram showing calculated and estimated probabilities for different websites, according to an embodiment.
Figure 6B:
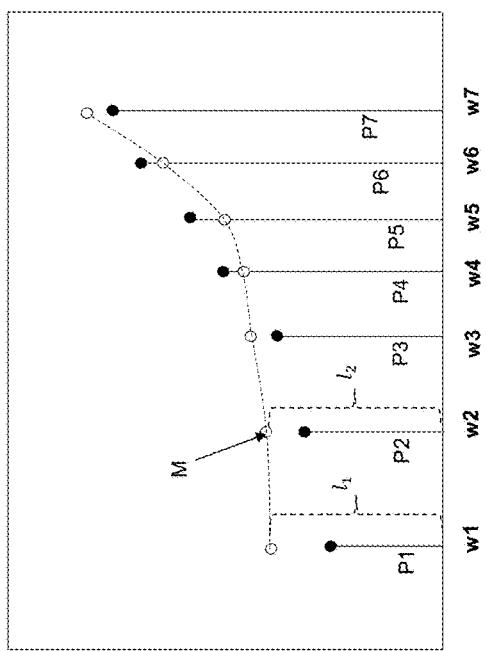
FIG. 6B is a visualization of a vector corresponding to a computer model and vectors corresponding to websites, according to an embodiment.

At 445 the method includes updating the model parameters of the computer model M using the actual conversion rates. The updating of the model parameters is performed to improve the predictions of the computer model M. One example implementation of the updating the model parameters is illustrated in connection with FIGS. 6A-6C. FIG. 6A shows actual conversion rates P1-P7 for websites $W_1$-$W_7$, and circles M correspond to probability predictions based on model C. For example, for website $W_1$ and $W_2$ the computer model M predicts respectively probabilities $l_1$, and $l_2$ while the actual conversion rates for these website are respectively P1 and P2. Thus, the computer model M result in prediction errors $l_1$-P1 and $l_2$-P2 for websites w1 and w2 respectively. Similar errors may be calculated for other websites $W_1$, $W_3$-$W_7$. Note that in some implementations of the computer model M, the probabilities $l_1$ and $l_2$, are obtained based on scores $p_1$ and $p_2$, as $l_1=1/(1+e^{-p_1})$, and $l_2=1/(1+e^{-p_2})$, where $p_1 = C \cdot w_1 = \|C\| \|w_1\| \cos(C, w_1)$, and $p_1 = C \cdot w_2 = \|C\| \|w_2\| \cos(C, w_2)$. Here $C=\{c_1, c_2, \ldots c_n\}$ a vector corresponding to the computer model M, $w_1$ and $w_2$ are n-dimensional embedding vectors corresponding to websites $W_1$ and $W_2$, and angles $\{C, w_1\}$ and $\{C, w_2\}$ are angles between vector C and embedding vectors $w_1$ and $w_2$ respectively. The vectors $w_1$, $w_2$, and C are shown in FIG. 6B with corresponding angles $\{C, w_1\}$ and $\{C, w_2\}$. Thus, as can be seen from FIG. 6B, adjusting orientation of vector C of the computer model M relative to, for example, vectors $w_1$, $w_2$ may result in smaller absolute values for prediction errors $l_1$-P1 and $l_2$-P2 which may lead to improved prediction of probabilities of conversion events for websites represented by embedding vectors $w_1$ and $w_2$. Note that, as described above, the model M must be properly calibrated in order to generate calibrated probabilities.

Figure 6C:
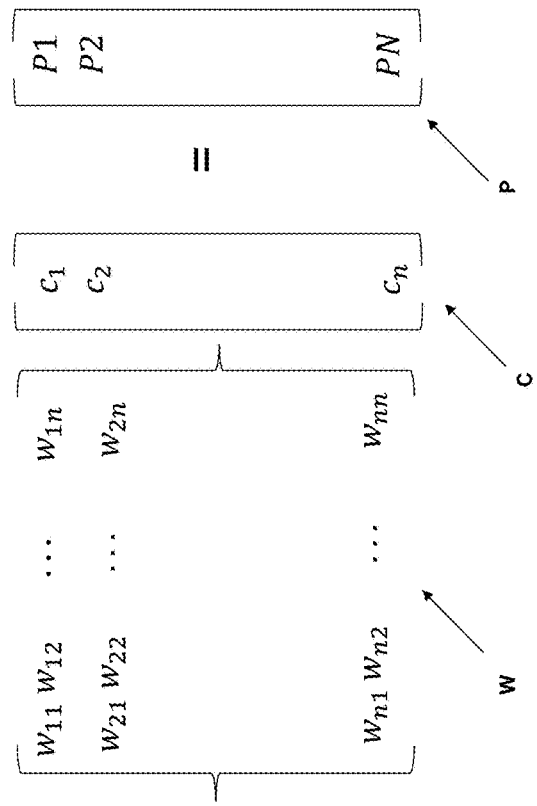
FIG. 6C is an example representation of a linear system of equations for determining the vector corresponding to a computer model, according to an embodiment.

In various embodiments, adjusting orientation of the vector C can be performed relative to all of the embedding vectors $w_1$-$w_7$, corresponding to websites $W_1$-$W_7$ to improve accuracy for all websites $W_1$-$W_7$. In general, when the number of the websites N in the subset of the websites is less or equal to n (n—number of dimensions for an n-dimensional space) a vector C can be found that gives precise predictions P1-PN for likelihood of conversion events for websites $W_1$-$W_N$. For example, when number of websites N is equal to n, there are $W_1$-$W_n$ websites each characterized by embedding vectors $w_1$-$w_n$. An example embedding vector $w_k$ has coefficients wk={$w_{k1}$, $w_{k2}$, . . . $w_{kn}$}, and the likelihood of conversion event, for model vector C={$c_1$, $c_2$, . . . $c_n$}, is given by $w_{k1}c_1 + w_{k2}c_2 + \ldots w_{kn}c_n$. Thus, for embedding vectors $w_1$-$w_n$, n linear equation can be formed as shown in matrix form in FIG. 6C to solve for coefficients $c_1 \ldots c_n$ exactly based on known likelihood conversion events P1-PN for websites $W_1$-$W_n$. FIG. 6C shows matrix W formed from components $w_{11}$ to $w_{nn}$ of website embedding vectors $w_1$-$w_n$, vector C={$c_1$, $c_2$, ... $c_n$}, and vector P={P1, P2, . . . PN}. The vector C can be found exactly as C=$W^{-1}$P.

Note that when more than n websites are used for the subset of websites, vector C may be determined based on a minimization of cost function using methods such as a gradient decent method (e.g., stochastic gradient descent, conjugate gradient method, and the like), least squares method, or any other suitable technique.

In some cases, after determining the vector C based on the obtained conversion rates for websites $W_1$-$W_N$, a new group of websites $W_{N+1}$-$W_U$ may be selected to determine if the computer model M characterized by vector C can accurately predict conversion rates for the websites in this new group of websites. If the computer model M does not predict accurately the conversion rates for these websites, the computer model M may be updated (e.g., by calculating a new vector C such that it minimizes $$\sum_{i=1}^{U} (C \cdot w_i - P_i)^2$$

).

In some cases, a logistic regression or other supervised machine learning model may be used as the computational model M for determining a probability of a conversion event. Such machine learning model may be trained using the historical observed conversion rates. The model may be initialized with an estimated model (e.g., a linear model characterized by coefficients C) and then be incrementally improved by incorporating post-impression conversions as they become available. In some embodiments, the events of FIG. 4 can be repeated any number of times, in some instances, until the model parameters converge.

Figure 7:
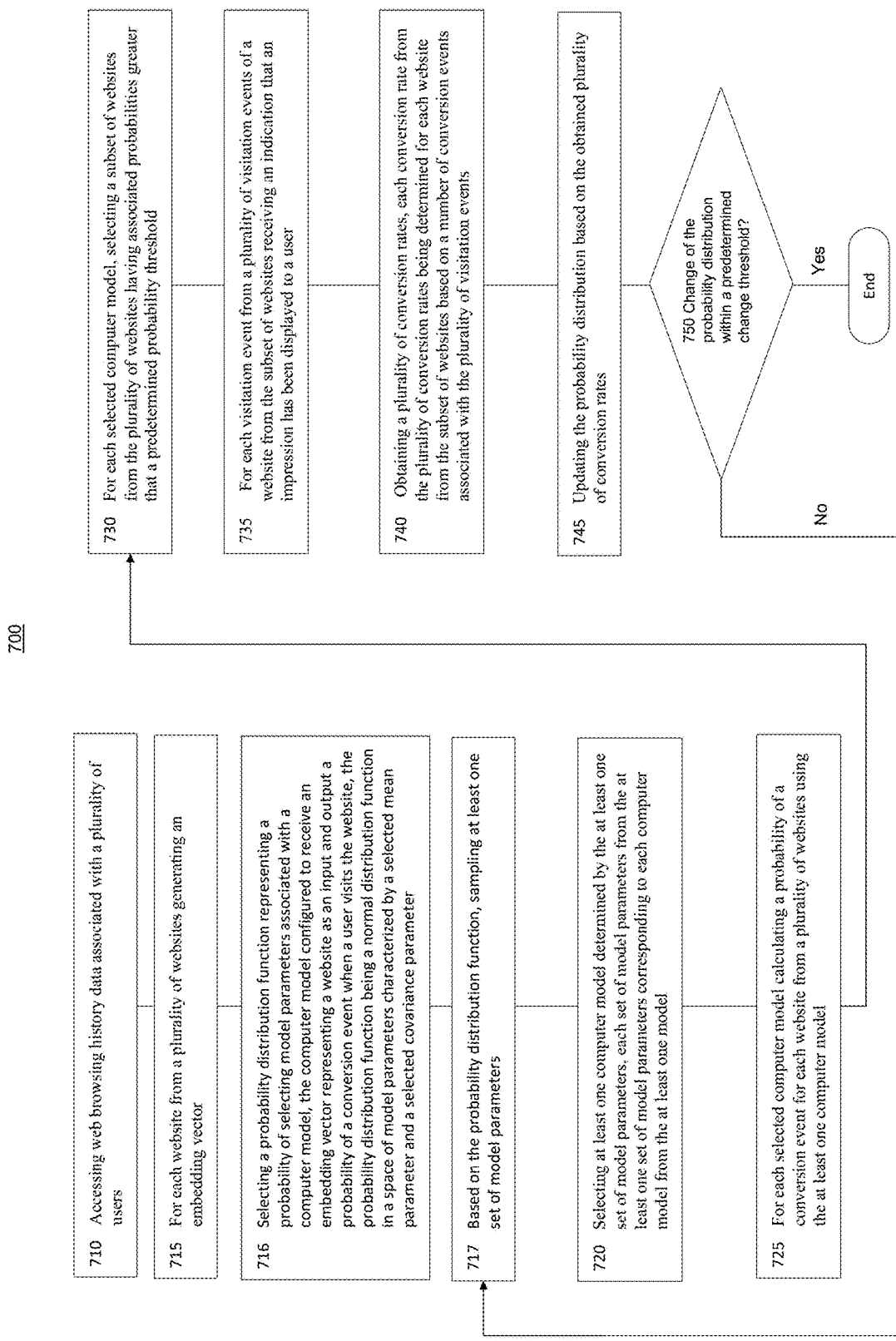
FIG. 7 is an illustrative diagram of a method for determining a probability of a conversion event for a website based on a probability distribution function for computer models, according to an embodiment.

The method 400 for optimizing performance of the computer model M is one possible approach for optimizing performance of the computer model M. Another example method 700, consistent with various embodiments discussed herein, is shown in FIG. 7. The method 700 includes various events of determining model parameters for the computer model M. As described above, in relation to method 400, the computer model M is configured to take as an input an embedding vector for a website and return, as an output, a probability of a conversion event for a particular advertisement when a user views the advertisement when browsing the website. Herein, an advertisement-specific computer model is used for predicting probabilities of conversion events for a particular advertisement.

The method 700 includes at 710 accessing web browsing history associated with a plurality of users and at 715 generating for each website from a plurality of websites an embedding vector. The method 700 at 710 and 715 can be similar to or the same as respective events 410 and 415 of method 400.

Further, method 700 includes selecting a probability distribution function of model parameters F at 716. The probability distribution function F represents the probability of selecting the set of model parameters associated with the computer model M when it is trained/built/programmed/defined with model parameters and sampled from the probability distribution function F. The computer model M is configured to receive an embedding vector representing a website as an input and output a probability of a conversion event when a user visits the website (e.g., upon user being exposed to an impression for that advertisement). The accuracy of the computer model M is evaluated by comparing the predictions of the probability 1 of a conversion event for a website to probability of the conversion event P based on observed conversion event data for that website, as described above by an error E.

Figure 8:
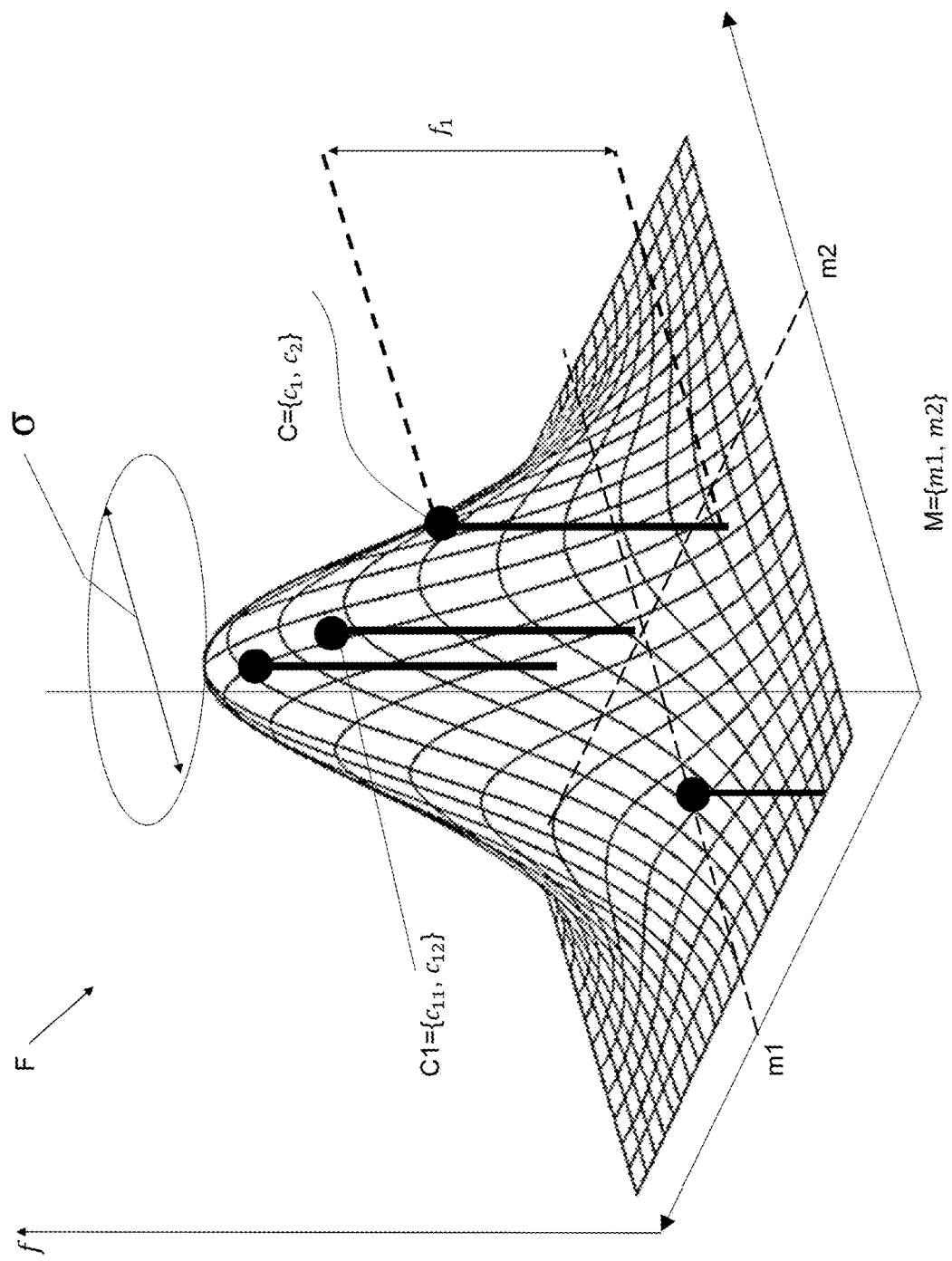
FIG. 8 is an example probability distribution function for computer models, according to an embodiment.

In some instances, the computer model M can be described by a vector C={$c_1$, $c_2$, ... $c_n$}, as described above in relation to FIG. 3, Thus the probability distribution F can map a vector C in an n-dimensional space to a single number (e.g., a number in a range between 0 and 1). An example 2-dimensional probability distribution function F is shown in FIG. 8. The 2-dimensional probability distribution F maps 2-dimensional vectors C={$c_1$, $c_2$} to probability values f (as shown on z axis in FIG. 8). FIG. 8 shows, for example, that for point C={$c_1$, $c_2$} characterizing the computer model M, the probability of sampling the set of model parameters C={$c_1$, $c_2$} in step 717 corresponding to the computer model M to predict probabilities of conversion event is given by value $f_1$.

The probability distribution function F may be approximated by a normal probability distribution characterized by a mean and a standard deviation (or a covariance). The mean may be characterized by a mean position point $\mu$={m1, m2}, as shown in FIG. 8. Here, m1=E[$c_1$], m2=E[$c_2$], $c_1$ and $c_2$, are components of vector C, as shown in FIG. 8, and E is an expectation operator. Further, as shown in FIG. 8, the probability distribution function F is characterized by a standard deviation $\sigma$ that in generalized n-dimensional space is given by a covariance matrix $\Sigma$, where $\Sigma_{ij}$=Cov ($c_i$, $c_j$). For an n-dimensional space, the probability distribution function F is given by $$F(c_1, c_2, \ldots, c_n) = \exp\left(-\frac{1}{2}(C-\mu)^T \sum\nolimits^{-1}(C-\mu)\right)\Big/\sqrt{(2\pi)^k |\sum|},$$

with $\Sigma^{-1}$ being an inverse of the matrix $\Sigma$, and $|\Sigma|$ being a determinant of $\Sigma$ (or generalized variance). It is worth noting that in some cases, the probability distribution function F can also be approximated by other suitable probability distribution functions. For example, it can be approximated by the Student's t-distribution, Chi-squared distribution, Logistic distribution, Laplace distribution, or any other suitable probability distribution function.

In various embodiments, selecting the probability distribution function F at 716 includes selecting mean point $\mu$ as well as standard deviation or a covariance. In some embodiments, the mean point $\mu$ may be selected to initially coincide with an origin of the n-dimensional space. Alternatively, a guess of a website having a high probability of a conversion event may be made, and the embedding vector corresponding to that website is used as a point for the location of the mean point $\mu$. Similarly selecting the initial guess for a covariance matrix $\Sigma$ may be based on the amount of exploration of a parameter space for the computer model parameters C, as further described below.

In some cases, the mean point $\mu$ may be determined using a machine learning model. For example, a machine learning model that was previously trained to predict visits to a set of URLs that are of interest to the client may be used. Additionally, or alternatively, a machine learning model trained to predict URLs associated with a general topic (e.g., luxury retail shopping) may be used. This machine learning model, described by a vector C in n-dimensional space as discussed above, can be used as the mean $\mu$ of the probability distribution function F. Such an approach may be useful when there is not enough data to train a model specific to the goal at hand, but there is enough data for training a related machine learning model. For example, before a campaign has begun, there may not be sufficient data based on impressions for a particular targeted advertisement (e.g., an advertisement for a particular shoe brand) to train a model to predict conversions for the advertisement, but there can be sufficient other data (e.g., data related to how often visits to a set of websites were followed by events associated with shoe shopping, such as visiting websites related to online shoe stores).

Returning to FIG. 7, at 717 sampling from a probability distribution function F at least one set of model parameters $C_1 = \{c_{11}, c_{12}\}$ corresponding to a computer model M1 (e.g., a sample point $C_1$ is shown in FIG. 8). The sampling can be performed using any suitable sampling approaches (e.g., using inverse transform sampling, or other appropriate methods). In some cases, multiple sets of model parameters $C_1$-$C_N$ may be sampled from the probability distribution function F, thus defining multiple corresponding computer models M1-MN. When the probability distribution function F does not correspond to a normal distribution (e.g., if the probability distribution function F has been updated such that it is no longer the normal probability distribution function), then it can be first approximated by a normal probability distribution function using a Laplace approximation technique, and then parameters $C_1$-$C_N$ may be sampled from the approximated normal probability distribution function. Approximating the probability distribution function with a normal probability distribution function results in lower computational costs associated with sampling the parameters from the probability distribution function.

Considering that the probability distribution function F is used for sampling computer model parameters C, when selecting the values for the covariance matrix $\Sigma$, the larger the value of $|\Sigma|$ the wider is the probability distribution function F, which leads to a possibility of performing a wider, on average, sampling of the computer model parameters C from the probability distribution function F (herein, the wider sampling refers to how far the sample may be collected away from the mean of the probability distribution function F, which, for the normal distribution, is also a mode of the probability distribution function F). Thus, selection of the matrix $\Sigma$ determines how much exploration is used for selecting the computer model based on the computer model parameters C. For instance, selecting a matrix $\Sigma$ with a larger value of $|\Sigma|$ leads to more sampling away from the mean of the probability distribution function F (i.e., wider sampling) than when selecting the matrix $\Sigma$ with a smaller value of $|\Sigma|$.

Note that determining the matrix $\Sigma$ is made when determining the initial probability distribution function F, which serves as a prior for Bayesian logistic regression (in the case where the machine learning approached used is logistic regression). Subsequently, the covariance matrix $\Sigma$ may be computed based on available data related to displayed impressions and the Laplace approximation. In some cases, one approach may include determining the covariance matrix $\Sigma$ such that $|\Sigma|$ is of the same order of magnitude as the model coefficients (or a norm $|C|$). For example, $|\Sigma|$ may be about 50%-400% of $|C|$. In some cases, individual components of the covariance matrix $\Sigma$ may be selected at random while maintaining that $|\Sigma|$ is about 50%-400% of $|C|$. In some cases, $|\Sigma|$ may be selected to be about unity.

Various approaches discussed herein for selecting the probability distribution function F (e.g., approaches for selecting matrix $\Sigma$ and the mean point $\mu$) results in a sampling which may be a variation of Thompson sampling. Thompson sampling is an approach for solving an explore/exploit trade-off. When running the advertising campaign, a high conversion rate or a high ratio of conversions to ad spend is desirable. This may be achieved by displaying impressions using the inventory having the highest known estimated probability of conversion (herein, such action is referred to as an exploitation action). At the same time, to improve predictions of conversion rates and discover inventory (e.g., websites) with high conversion rates, impressions may be displayed on websites that may not have the highest known estimated probability of conversion (herein, such action is referred to as an exploration action). Thompson sampling includes both exploitation and exploration actions with exploitation actions accounting for a fraction of all the actions (e.g., about 50%, 55%, 60%, 65%, 70%, 75%, 80%, 85%, 90%, 95%, 99%, and the like of all actions). It should be noted that known Thompson sampling techniques may require an iteration per data point, where the iteration includes gathering data and updating the model. This approach may become impractical if it takes significant time (e.g., minutes, hours or days) to collect a datapoint.

Note that in contrast with Thompson sampling, multiple computer models parameters corresponding to multiple computer models may be sampled from the probability distribution function F simultaneously, and each computer model can be used for selecting a plurality of websites for showing a plurality of impressions for each website. Here, the number of models determined at once based on sampling computer model parameters from the probability distribution function F, as well as a number of websites in the plurality of websites that is being used for showing the impressions can be selected to optimize an overall performance of the method 700 (e.g., to minimize a number of overall impressions needed to be displayed on various websites for determining a computer model for predicting conversion events, and/or the predictive performance of the computer model, or maximizing the overall "reward" for example the ratio of conversion to ad spend, over the course the campaign). Such an approach leads to a significant improvement over the Thompson sampling in that Thompson relies on a collection of conversion event data for each computer model sequentially, and since the collection of the conversion event data may take a considerable amount of time (e.g., a day), the Thompson sampling may be unacceptably slow (e.g., a typical digital advertising campaign runs millions of ad impressions per week, so it is impossible to wait a day after each impression is shown in order to update the model before showing another impression).

At 720, selecting at least one model (e.g., the computer model M1 and/or the computer model M2) determined by the at least one set of model parameters (e.g., by model parameters C1 and/or model parameters C2), where each set of model parameters is associated with each model. The method 700 at 720 can be similar to event 420 of the method 400. Further, the method 700 may proceed at 725 to calculating, for each selected computer model, for each website from the plurality of the websites (the plurality of websites is selected at 715 of method 700) a probability of a conversion event for the website using the selected model (e.g., using the computer model M1 and/or the computer model M2), and at 730 selecting, for each computer model, a subset of websites from the plurality of websites having associated calculated probabilities greater that a predetermined probability threshold. Note that method 700 at 725 and 730 may be similar to corresponding events 425 and 430 of method 400. When more than one computer model is used, multiple selected subsets of websites (each subset of websites corresponding to the associated computer model) may be combined into a combined subset of websites.

Multiple ways exist for selecting websites for the combined subset of websites using selected computer models (such as computer models M1 and M2). For instance, consider that the combined subset of websites is used to contain websites in top one percent or top few percent of websites having highest likelihoods of conversion events. If multiple computer models are used (e.g., ten computer models used for determining combined subset of websites) and the combined subset of websites are in, for example, a top of 1% of websites having highest likelihoods of conversion events, then a first computer model can be used to choose a list of top sites that are in 0.1% of total impression volume. Then, from the remaining sites alone, a second computer model can be used to choose a list of top sites that are in 0.1% of total impression volume. This process may be repeated for the remaining 8 models, which will result in a final list of sites that are in 1% of total websites having highest likelihoods of conversion events.

Over the course of a period of time, for example a day, the target number of impressions shown on various websites can be selected to target a predicted number of conversions. For example, the number of impressions may be selected to result in conversions only at a few websites (e.g., conversion only at about 2-10 different websites). Showing fewer impressions than the target number of impressions can result in large times for improving (e.g., optimizing) the computer model for determining likelihood of conversion events and showing more impressions than the target number of impressions can result in large costs associated with displaying such impressions at different websites.

Further, the method 700 includes at 735 receiving an indication of an impression being displayed to a user for each visitation event for the user visiting a website from the combined subset of websites. The method further includes at 740 obtaining actual and/or observed plurality of conversion rates for each website from the subset of websites based on a one or more conversion events associated with the plurality of visitation events. The method 700 at 735 and 740 can be similar to events 435 and 440 of the method 400, with a difference that a combined subset of websites may be used instead of a subset of websites as used by method 400.

Further, the method 700 includes at 745 updating the probability distribution function F based on the actual plurality of conversion rates for different websites from the combined subset of websites as determined at 740. The updating at 745 may use Bayes' Rule for updating probability distributions based on newly acquired information about observed conversion rates (e.g., a Bayesian logistic regression with the Laplace approximation may be used). In various embodiments, the updated probability distribution function F may be approximated by normalized distribution function with an updated mean u and the updated covariance E.

In various instances, the method 700 may further include at 750 determining if the probability distribution function F is changing significantly after the updating at 745. For example, the change in the probability distribution function F can be determined to be significant if it is larger than a predetermined change threshold. The change of the probability distribution function F can be evaluated by determining a change in a mean of the probability distribution function F and/or covariance of the probability distribution function F. For example, if the mean of the probability distribution function F changes by less than a predetermined mean threshold and if the covariance of the probability distribution function F changes less than a predetermined covariance threshold, then it can be determined that the probability distribution function F has not changed significantly during the updating at 745. Alternatively, other approaches may be used for determining the amount of change of the probability distribution function F. For example, if there is a change $\Delta u$ of the mean of the probability distribution function F and there is a change 42 of the covariance of the probability distribution function/ when probability distribution function F is updated at 745 a change function $E(\Delta\mu, \Delta\Sigma)$ can be defined and may be evaluated to determine if $E(\Delta\mu, \Delta\Sigma) < E_{threshold}$. An example change function may be $E = a_1 \Delta\mu \cdot \Delta\mu + a_2 |\Delta\Sigma|$, with $|\Delta\Sigma|$ being a determinant of $\Delta\Sigma$, and $a_1$, and $a_2$ being selected weight parameters. Note that other suitable change functions can be used that use as an input vector $\Delta\mu$ and matrix $\Delta\Sigma$ and output a number measuring a change of probability distribution function F.

If no significant change of the probability distribution function F occurs after the updating at 745, e.g., the change of the probability distribution function F is within a predetermined change threshold (at 745, "Yes"), the method 700 can be completed. Alternatively, if the change of the probability distribution function F is significant after the updating at 745, e.g., the change of the probability distribution function F is not within a predetermined change threshold (at 745, "No"), the method 700 may proceed to 717 and 717-750 of method 700 can be repeated. In some cases, probability distribution function F may be allowed to be updated (e.g., $E_{threshold} \to 0$) while the advertising campaign is ongoing. Such an approach may be beneficial if market conditions change during an advertising campaign. For example, if an advertising campaign includes impressions that advertise a breakfast cereal, and if a celebrity reveals the cereal to be a personal favorite, then a probability of a conversion event for impressions displayed on the websites associated with celebrity news may increase, thereby affecting the probability distribution function F.

Figure 9:
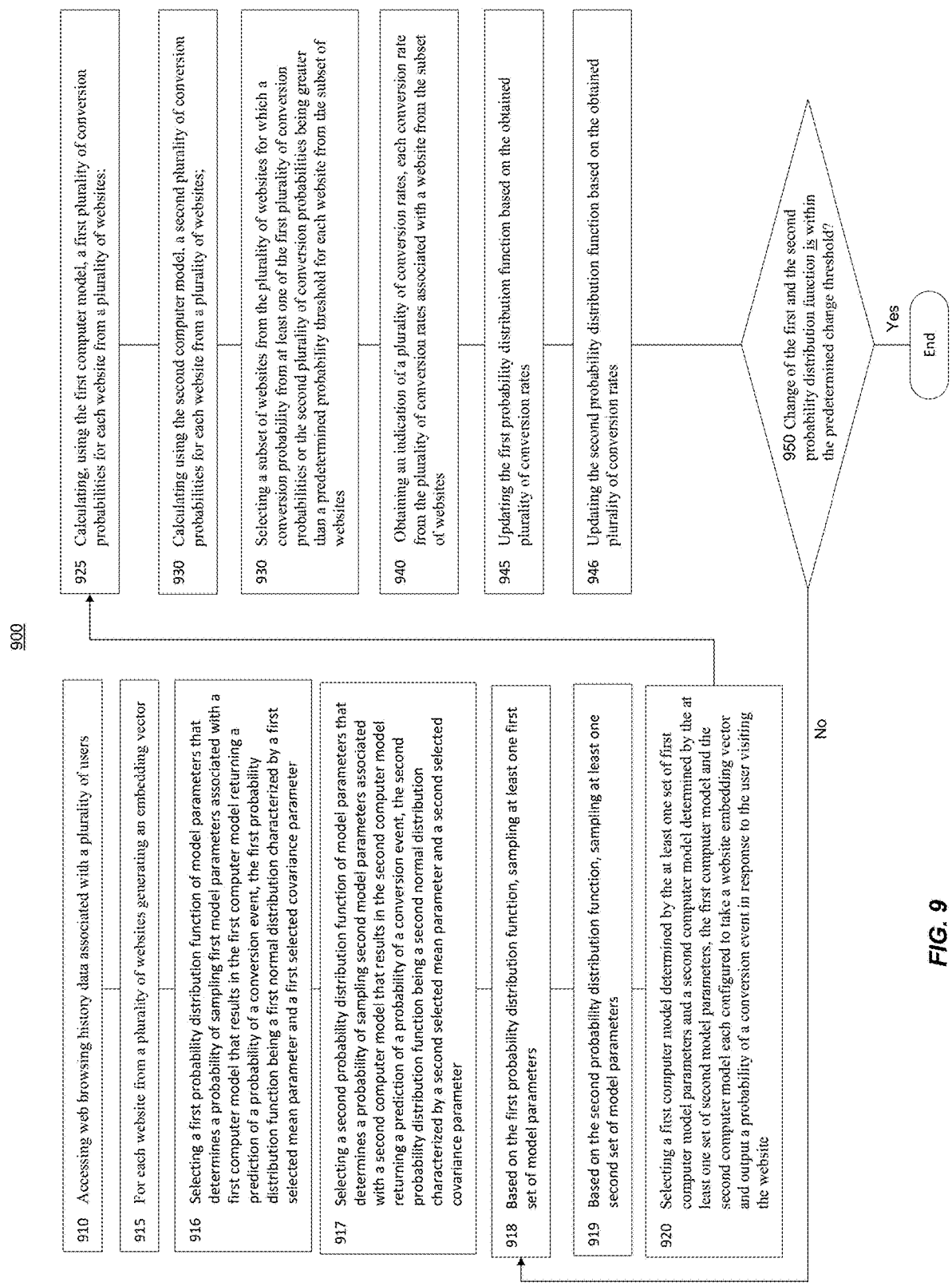
FIG. 9 is another illustrative diagram of a method for determining a probability of a conversion event for a website based on a probability distribution function for computer models, according to an embodiment.

FIG. 9 shows an example method 900 which may be a variation of method 700. The method 900 includes accessing web browsing history associated with a plurality of users at 910 and generating an embedding vector for each website from a plurality of websites at 915. The events 910 and 915 of method 900 may be the same as or similar to events 710 and 715 of method 700.

Further, the method 900 includes, at 916, selecting a first probability distribution function of model parameters F1. The probability distribution function F1 represents accuracy of a computer model M when it is trained/built/programmed/defined with model parameters and sampled from the probability distribution function F1. Thus, the probability distribution function F1 represents the accuracy of model parameters associated with the computer model M. The computer model M is configured to receive an embedding vector representing a website as an input and output a probability of a conversion event. The accuracy of the computer model M is evaluated by comparing the predictions of the probability l of a conversion event for a website to probability of the conversion event P, as described above. The first probability distribution function F1 may be a normal distribution characterized by a selected first mean parameter and a selected first covariance parameter.

At 917 a second probability distribution function F2 can be selected. The second probability distribution function describes a probability of selecting a computer model (e.g., a second computer model M2, which may be similar to or the same as the computer model M as described above) from the second probability distribution. The second probability distribution function may be also a normal distribution characterized by a selected second mean parameter and a selected second covariance parameter. The events 916 and 917 may be similar to events 716 of the method 700. In one example embodiment, the first mean parameter may be different from the second mean parameter. For example, the first mean parameter may correspond to an origin of the n-dimensional space and the second mean parameter may correspond to a characteristic vector associated with a previously trained or selected model. In some cases, the first covariance may be the same as the second covariance. In various cases, at least some parameters of the first probability distribution function may be different from the corresponding parameters of the second probability distribution function. For example, when first covariance parameter may be the same as the second covariance parameter, while the first mean parameter may be different from the second mean parameter.

In some cases, the first mean parameter may be determined by a first machine learning method that is configured to estimate probabilities of conversion events for a first set of websites, and a second mean parameter may be determined by a second machine learning method that is configured to estimate probabilities of conversion events for at least a second set of websites. For instance, using the first machine learning method the coefficients $C_1$ defining a first computer model may be determined (the coefficients $C_1$ may be an n-dimensional vector as described above), and these coefficients may be used as a mean point $\mu_1$ for the first probability density function. Similarly, using the second machine learning method the coefficients $C_2$ defining a second computer model may be determined (the coefficients $C_2$ may be an n-dimensional vector as described above), and these coefficients may be used as a mean point $\mu_2$ for the second probability density function. The first and the second machine learning methods may be any suitable machine learning methods for estimating probabilities of conversion events for sets of websites. In some cases, the first and/or the second machine learning methods may be machine learning neural network models trained using conversion event data for various websites that display impressions associated with the advertising campaign.

The method 900 also includes, at 918, sampling at least one first set of model parameters based on the first probability distribution function, and, at 919, sampling at least one second set of model parameters based on the second probability distribution function. The events 918 and 919 may be similar to the event 717 of the method 700. In various embodiments, a first number of models N1 may be sampled from the first probability distribution function, and a second number of models N2 may be sampled from the second probability distribution function. In some cases, the ratio of N1/N2 may depend on confidence in the first probability distribution function and the second probability distribution function. For example, if there is twice as much confidence in the first probability distribution function than in the second probability distribution function, N1/N2 may be equal to 2.

Further, the method 900 includes, at 920, selecting at least a first model determined by the at least one first set of model parameters and at least a second model determined by the at least one second set of model parameters, wherein the at least one first model and the at least one second model are configured to take a website embedding vector and output a probability of a conversion event in response to the user visiting the website. The event 920 of method 900 may be similar to the event 720 of method 700.

Further, the method 900 includes for a first selected computer model, for each website from a plurality of websites, using the first selected computer model, calculating a first plurality of conversion probabilities at 925. Additionally, the method 900 includes for a second selected computer model, for each website from a plurality of websites, using the second selected computer model, calculating a second plurality of conversion probabilities at 930. Further the method includes selecting a subset of websites from the plurality of websites for which a conversion probability from at least one of the first plurality of conversion probabilities or the second plurality of conversion probabilities is being greater than a predetermined probability threshold for each website from the subset of websites at 930. Further, the method 900 includes obtaining, at 940, an indication of a plurality of conversion rates, each conversion rate from the plurality of conversion rates associated with a website from the subset of websites. In various embodiments, the events 925-940 of method 900 may be similar to or the same as the events 725-740 of method 700.

The method 900 also includes, at 945, updating the first probability distribution function based on the actual (e.g., observed) conversion rates and, at 946, updating the second probability distribution function based on the actual (e.g., observed) conversion rates. The events 945 and 946 may be similar to events 745 of method 700. In various cases, the updates to the first and the second distribution functions may use all of the available conversion event data collected from users visiting all of the websites on which the impressions are displayed. Such an approach differentiates from performing determination of a computer model using method 700 in parallel or sequentially. For example, conversion events observed on websites, which were selected for displaying impressions based on sampling using the second distribution function may be used for updating the first distribution function, and vice versa, conversion events observed on websites, which were selected for displaying impressions based on sampling using the first distribution function may be used for updating the second distribution function.

The method 900 further includes an event 950 for determining if the first and the second probability distribution functions change significantly after the updating events 945 and 946. This event may include approaches similar to ones discussed for event 750 of method 700. For example, a change function may be evaluated for the first and the second probability distribution function to determine the amount of change in the respective first and second probability distribution functions. If these probability distribution functions do not change significantly, e.g., the change in the first and the second probability distribution function is within a predefined change threshold, (at 950, "Yes") then the method 900 may be completed. Alternatively, of at least one the first or the second probability distribution function show a significant change after respective updating event 945 and/or 946 (at 950, "No"), then the method 900 may proceed to event 918.

It should be noted that other methods similar to method 900 may be used, which may not be limited to selecting only a pair of probability distribution functions. For instance, a variation of a method 900 may utilized three, four, five, twenty, or any suitable number of probability distribution functions. Such methods may include event similar to events of method 900 but generalized to more than two probability distribution functions.

Figure 10:
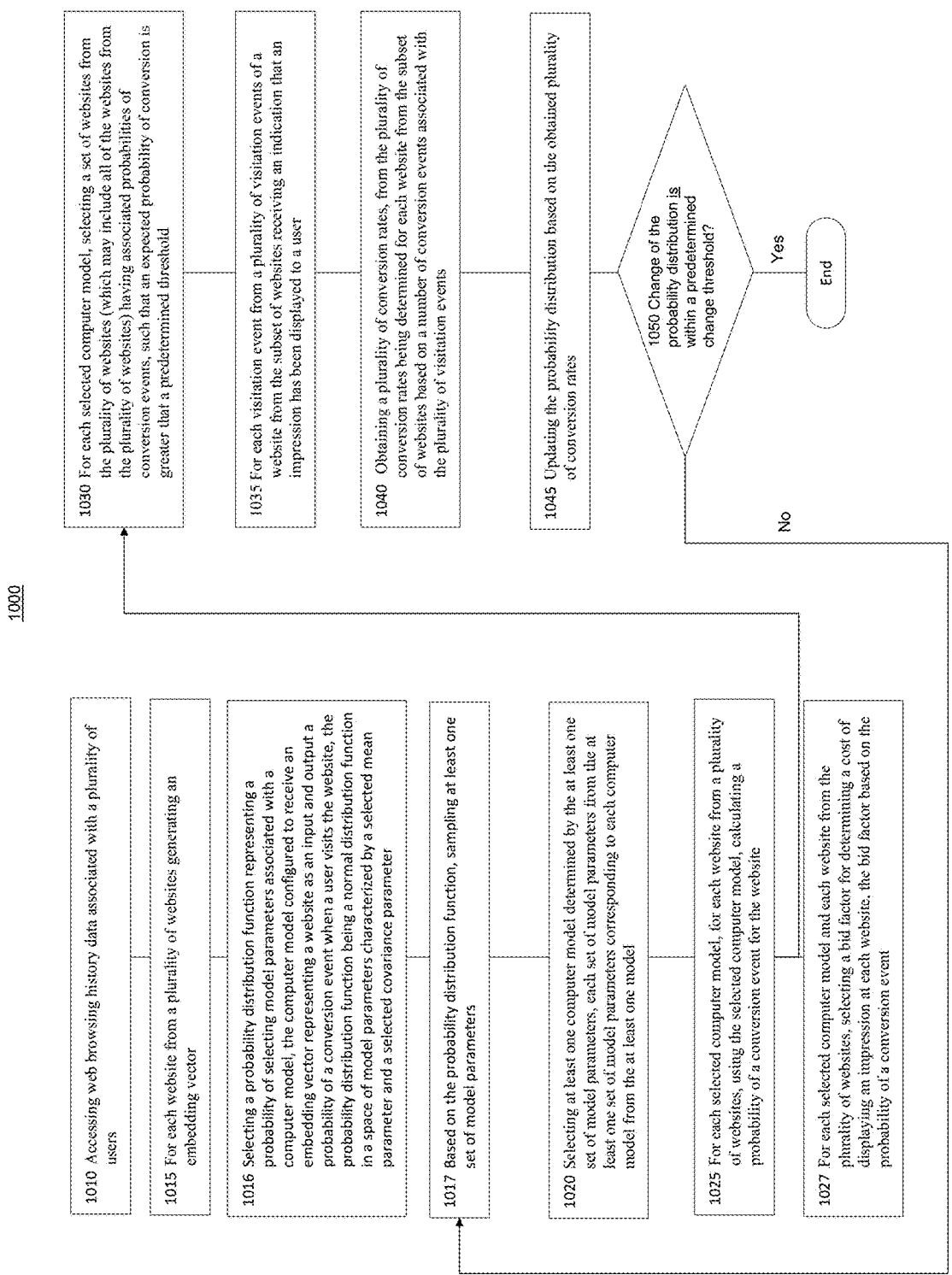
FIG. 10 is an illustrative diagram of a method for determining a probability of a conversion event for a website and bidding on websites based on a bid factor, according to an embodiment.

FIG. 10 shows an example method 1000 which may be a variation of method 700. The method 1000. For example, events 1010-1025 and 1035-1050 may be the same as or similar to respective events 710-725 and 735-750. Additionally, the method 1000 includes, for each selected model and each website from the plurality of websites used at event 1025, selecting a bid factor for determining a cost of displaying an impression at each website based on the probability of conversion at 1027. The bid factor, as described above, may be a number greater than zero, used as a multiplier on a base bid price, to either increase or decrease the price of the inventory. In some cases, an advertiser may include in their inventory selection a website with a low probability of a conversion event but having a correspondingly low cost of displaying the impression (i.e., having a small bid factor). The bid factor can be determined, for example, to be proportional to the probability of a conversion event (herein, also referred to as the probability of conversion), so that every ad impression carries the same expected value for cost per conversion event (herein also referred to as the cost per conversion). The advertiser can control the expected cost per conversion by setting an appropriate base bid price. This allows the advertiser to make use of all possible ad inventory, with a consistent average cost per conversion across all inventory.

Since targeted advertising involves a trade-off between precision (high conversion rate) and scale (number of impressions), the ability to make use of all inventory expands the available scale and provides a significant performance advantage. In general, expanding the available inventory allows the advertisers to either increase scale at a fixed precision, or increase precision at fixed scale. The base bid can be chosen to achieve a desired price per conversion or can be adjusted to achieve the desired scale. For example, the advertiser may start with a base bid corresponding the highest acceptable cost per conversion, and gradually lower the base bid to the lowest price (and correspondingly the lowest cost per conversion) before the campaign fails to deliver the desired scale. Conversely, the advertiser may start with a low base bid and increase it until it either reaches the desired scale or the maximum acceptable cost per conversion Other functions for setting the bid factor based on the probability of conversion may be used as well. For example, if the advertiser wishes to bid less often on inventory with a low conversion rate, a conversion rate threshold may be set, and inventory with conversion rate at the threshold may be set to have a bid factor of 1. The bid factor for inventory with greater conversion rates than the threshold can increase linearly with conversion rate, and the bid factor for inventory with lower conversion rates can decrease sublinearly with conversion rate. This way, inventory with low conversion rates is only used when available at a very low price resulting in a low cost per conversion. Determination of the bid factor may also include information not provided by the model. For example, if data on the win rate of auctions for a website is available, the bid factor can proportional to conversion rate, with a maximum bid price corresponding to a win rate threshold, a price at which a high percent of auctions will be won.

Note that calculating bid factors for each website requires a well-calibrated prediction of conversion probability for each website. Existing methods, such as Thompson sampling, are insufficient here for two reasons. First, previous methods focus on identifying the best websites, rather than learning well-calibrated probabilities for each website. By contrast, the methods proposed herein (e.g., method 1000) identify the best models, which provide a well-calibrated probabilities for each website. In fact, the method 1000 can be used to learn any property across a set of websites (e.g., the percentage of people visiting that website associated with a given demographic), whereas Thompson sampling and similar existing approaches can only learn which sites are "best" on some metric. Rather than identify the best individual websites, the method 1000 (as well as other methods discussed herein) identifies the best models, where each model predicts a property of interest for all websites. Second, previous methods may require exploration of a website in order to learn about that website. All methods described herein, such as method 1000, use an embedding space to generalize to websites that have not yet been explored.

Further, the method 1000 includes at 1030, for each selected model, selecting a set of websites from the plurality of websites (the set of websites may include all of the websites from the plurality of websites) having associated probabilities of conversion events, such that conversion probability is greater than a predetermined threshold. The advertiser may choose to set the predetermined threshold greater than zero if they prefer to limit placement of advertisements to only "related" sites, even though all sites may carry the same expected cost per conversion, depending on how the bid factor is determined. Additionally, using a bid factor to select the bid price paid to display an impression at each website selects a set of websites from the plurality of websites by excluding websites with an infeasibly low bid price, or a bid price below the minimum allowable bid price on a platform. For example, if the base bid for a campaign is set to $1.00 per thousand impressions, and the bid factor is less than 0.01, the resulting bid price is less than $0.01 per thousand impressions, which would be too low to actually purchase any ads on most platforms.

While various inventive embodiments have been described and illustrated herein, one will readily envision a variety of other means and/or structures for performing the function and/or obtaining the results and/or one or more of the advantages described herein, and each of such variations and/or modifications is deemed to be within the scope of the inventive embodiments described herein. In particular, embodiments described herein generally describe behavioral data in the context of web browsing activity carried out via browser applications. It should be understood that behavioral data can include any suitable interactions with a user device, such as indications of application usage, in-app activity data, etc. More generally, one will readily appreciate that all parameters, dimensions, materials, and configurations described herein are meant to be exemplary and that the actual parameters, dimensions, materials, and/or configurations will depend upon the specific application or applications for which the inventive teachings is/are used. One will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of the present technology may be implemented using hardware, firmware, software or a combination thereof. When implemented in firmware and/or software, the firmware and/or software code can be executed on any suitable processor or collection of logic components, whether provided in a single device or distributed among multiple devices.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The terms "substantially," "approximately," and "about" used throughout this Specification and the claims generally mean plus or minus 10% of the value stated, e.g., about 100 would include 90 to 110.

As used herein in the specification and in the claims, the terms "target" and "control target" are used interchangeably.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A non-transitory computer-readable medium storing instructions that, when executed by a processor, causes the processor to perform operations comprising:
   accessing web browsing history associated with a plurality of users; for each website from a plurality of websites generating an embedding vector based on the web browsing history;
   selecting a probability distribution function characterized by a mean vector and a covariance matrix, the probability distribution function representing a probability of selecting values, from a range of values, for each model parameter from a plurality of model parameters, the plurality of model parameters associated with a model, the model configured to receive an embedding vector representing a website as an input and output a predicted probability of conversion when the website is visited;
   sampling a plurality of sets of model parameter values based on the probability distribution function, each set of model parameters values from the plurality of sets of model parameter values defining an instance of the model from a plurality of instances of the model; for each instance of the model, calculating the predicted probability of conversion for a first plurality of websites;
   selecting a second plurality of websites, each website from the second plurality of websites being a website from the first plurality of websites associated with the predicted probability of conversion greater than a predetermined probability threshold as calculated by at least one instance of the model;
   facilitating delivery of at least one item of targeted content to a plurality of users via the second plurality of websites based on each website from the second plurality of websites being associated with the predicted probability of conversion event greater than the predetermined probability threshold;
   obtaining a plurality of actual conversion rates, each actual conversion rate from the plurality of conversion rates being associated with the at least one item of targeted content and the website from the second plurality of websites with which that item of targeted content was delivered; and
   updating the probability distribution function based on the actual conversion rates such that probabilities of possible values for at least one model parameter from the plurality of model parameters has at least one of a shifted mean parameter or a different covariance parameter relative to probabilities of possible values for that model parameter prior to updating the probability distribution function.

2. The non-transitory computer-readable medium storing instructions of claim 1, wherein the code to cause the processor to select the probability distribution function further comprises code to cause the processor to select the mean vector at an origin of an n-dimensional embedding space.

3. The non-transitory computer-readable medium storing instructions of claim 1, wherein:
   the probability distribution function is a normal distribution function in a space of model parameters; and
   the mean vector of the normal distribution is based on a computer model for predicting conversion rates for a set of websites.

4. The non-transitory computer-readable medium storing instructions of claim 3, wherein the computer model is a machine learning neural network model.

5. The non-transitory computer-readable medium storing instructions of claim 3, wherein the set of websites is a subset of the first plurality of websites.

6. The non-transitory computer-readable medium storing instructions of claim 1, wherein:
   the probability distribution function is a normal distribution function in a space of model parameters; and
   the mean vector is an embedding vector in an n-dimensional embedding space, the embedding vector corresponding to a website that has an expected probability of a conversion event that is higher than a selected probability threshold.

7. The non-transitory computer-readable medium storing instructions of claim 1, wherein the operations further comprise:
   repeating the sampling, the calculating, the selecting the second plurality of websites, the obtaining, and the updating until updating the probability distribution function results in changes in the probability distribution function being less than a target threshold change.

8. The non-transitory computer-readable medium storing instructions of claim 1, wherein sampling the plurality of sets of model parameter values includes approximating the probability distribution function by a normal distribution.

9. A computer-implemented method, comprising:
   selecting a first probability distribution function characterized by a first mean vector and a first covariance matrix, the first probability distribution function representing a probability of selecting values, from a first range of values, for first model parameters associated with a model configured to receive a vector representing a website as an input and output a predicted probability of conversion;
   selecting a second probability distribution function characterized by a second mean vector and a second covariance matrix, the second probability distribution function representing a probability of selecting values, from a second range of values, for second model parameters associated with the model;

sampling a plurality of sets of model parameter values based on the first probability distribution and the second probability distribution function, each set of model parameter values from the plurality of sets of model parameter values defining an instance of the model from a plurality of instances of the model;

calculating, using a first instance of the model from the plurality of instances of the model, a first plurality of conversion probabilities for each website from a plurality of websites;

calculating using a second instance of the model from the plurality of instances of the model, a second plurality of conversion probabilities for each website from the plurality of websites;

selecting a subset of websites from the plurality of websites for which a conversion probability from at least one of the first plurality of conversion probabilities or the second plurality of conversion probabilities is greater than a predetermined probability threshold;

obtaining an indication of a plurality of actual conversion rates, each actual conversion rate from the plurality of conversion rates associated with a website from the subset of websites;

updating the first probability distribution function based on the plurality of actual conversion rates; and updating the second probability distribution function based on a difference between the first plurality of conversion probabilities and the plurality of actual conversion rates such that an updated second probability distribution function is characterized by at least one of a shifted second mean vector or a different second covariance matrix.

10. A computer-implemented method, comprising:

selecting a mean vector and a covariance matrix that at least partially define a probability distribution function representing a probability of selecting values, from a range of values, for each model parameter from a plurality of model parameters associated with a model, the model configured to receive a vector representing a website as an input and output a predicted probability of conversion when the website is visited;

sampling a plurality of sets of model parameter values based on the probability distribution function, each set of model parameters values from the plurality of sets of model parameter values defining an instance of the model from a plurality of instances of the model;

for each instance of the model, calculating the predicted probability of conversion for a first plurality of websites;

selecting a second plurality of websites, each website from the second plurality of websites being a website from the first plurality of websites associated with the predicted probability of conversion greater than a predetermined probability threshold as calculated by at least one instance of the model;

for each website from the second plurality of websites, selecting a bid factor for determining a cost of displaying an impression, the bid factor based on the predicted probability of conversion;

for each visitation event from a plurality of visitation events of a website from the second plurality of websites, receiving an indication that an impression has been displayed to a user;

obtaining a plurality of actual conversion rates, from the plurality of actual conversion rates being determined for each website from the second plurality of websites based on a number of conversion events associated with the plurality of visitation events; and updating the probability distribution based on the actual conversion rates such that probabilities of possible values for at least one model parameter from the plurality of model parameters has at least one of a shifted mean or a different covariance relative to probabilities of possible values for that model parameter prior to updating the probability distribution function.

11. The computer-implemented method of claim 10, wherein the bid factor for each website from the second plurality of websites is selected to be proportional to the predicted probability of conversion for that website.

* * * * *